(12) United States Patent
Matthew et al.

(10) Patent No.: US 12,441,217 B2
(45) Date of Patent: Oct. 14, 2025

(54) SEMI ACTIVE SUSPENSION CONTROL METHODS USING SKYHOOK AND ENDSTOP CONTROL

(71) Applicant: LORD Corporation, Cary, NC (US)

(72) Inventors: Abraham Matthew, Cary, NC (US); Michael Mattson, Moncure, NC (US); Jeffrey Cranmer, Raleigh, NC (US)

(73) Assignee: LORD Corporation, Cleveland, OH (US)

( * ) Notice: Subject to any disclaimer, the term of this patent is extended or adjusted under 35 U.S.C. 154(b) by 236 days.

(21) Appl. No.: 18/036,450

(22) PCT Filed: Nov. 17, 2021

(86) PCT No.: PCT/US2021/059711
§ 371 (c)(1),
(2) Date: May 11, 2023

(87) PCT Pub. No.: WO2022/109015
PCT Pub. Date: May 27, 2022

(65) Prior Publication Data
US 2024/0017653 A1 Jan. 18, 2024

Related U.S. Application Data

(60) Provisional application No. 63/115,819, filed on Nov. 19, 2020.

(51) Int. Cl.
*B60N 2/00* (2006.01)
*B60N 2/50* (2006.01)
*G05D 19/02* (2006.01)
*F16F 15/00* (2006.01)

(52) U.S. Cl.
CPC ............. *B60N 2/501* (2013.01); *B60N 2/502* (2013.01); *G05D 19/02* (2013.01); *F16F 15/002* (2013.01)

(58) Field of Classification Search
None
See application file for complete search history.

(56) References Cited

U.S. PATENT DOCUMENTS

| | | | |
|---|---|---|---|
| 5,276,622 A | 1/1994 | Miller et al. |
| 5,582,385 A | 12/1996 | Boyle et al. |
| 5,652,704 A | 7/1997 | Catanzarite |
| 5,712,783 A | 1/1998 | Catanzarite |

(Continued)

FOREIGN PATENT DOCUMENTS

| | | |
|---|---|---|
| JP | 2009019674 A | 1/2009 |
| JP | 2009154592 A | 7/2009 |

(Continued)

OTHER PUBLICATIONS

PCT/US/2021/059711; International Preliminary Search Report; Lord Corporation; pp. 1-6 May 16, 2023.

*Primary Examiner* — Steven M Marsh
(74) *Attorney, Agent, or Firm* — McAfee & Taft

(57) ABSTRACT

A method is disclosed to smooth the ride of a seat occupant by controlling the damping force of a fluid damper positioned between the seat and base. The method selects between different subprocesses to minimize the ride discomfort and to minimize peak seat accelerations and endstop jerks. The controller uses the input from the different subprocesses to create the best ride for the immediate operational conditions.

16 Claims, 26 Drawing Sheets

(56) References Cited

U.S. PATENT DOCUMENTS

| | | | |
|---|---|---|---|
| 5,964,455 A | 10/1999 | Catanzarite et al. | |
| 2007/0278057 A1* | 12/2007 | Wereley | B60N 2/4242 188/267.1 |
| 2008/0156602 A1* | 7/2008 | Hiemenz | F16F 9/53 188/267.1 |
| 2010/0179730 A1* | 7/2010 | Hiemenz | B60N 2/42736 701/45 |
| 2011/0035118 A1* | 2/2011 | Hiemenz | F16F 15/002 701/45 |
| 2021/0107385 A1 | 4/2021 | Kuretake | |
| 2022/0126730 A1* | 4/2022 | Maust | B60N 2/02246 |
| 2022/0314725 A1* | 10/2022 | Kuretake | B60G 17/0195 |
| 2024/0416809 A1* | 12/2024 | Furuta | B60N 2/501 |

FOREIGN PATENT DOCUMENTS

| | | |
|---|---|---|
| WO | 0181115 A1 | 11/2001 |
| WO | 0183260 A1 | 11/2001 |
| WO | 0183261 A1 | 11/2001 |
| WO | 2004065147 A1 | 8/2004 |

* cited by examiner

SEMI ACTIVE SUSPENSION CONTROL METHODS USING SKYHOOK AND ENDSTOP CONTROL

CROSS-REFERENCE TO RELATED APPLICATION

The present application claims the benefit of U.S. Provisional Patent Application Ser. No. 63/115,819, filed on Nov. 19, 2020, and entitled "IMPROVED SUSPENSION SEMI ACTIVE SKYHOOK CONTROL SYSTEM AND METHOD," the disclosure of which is incorporated herein by reference in its entirety.

FIELD OF INVENTION/BACKGROUND

The present invention is directed to the field of controllable seat dampers. More specifically, the present invention is directed to a method for dynamically controlling a semi-active seat damper system.

BACKGROUND

One issue with seat dampers is that they do not completely resolve the rough ride issue for a passenger. Although seat dampers have been used for many years in vibration and/or shock attenuating systems, such as the seat suspension systems of automobiles, heavy trucks, and off-road equipment, there is still the problem of the seat jerking as it approaches an endstop or having a lead/lag bounce effect as the damping system attempts to catch up with the actual motion of the seat damper.

Although seat dampers may take other forms, they commonly comprise piston and cylinder assemblies having variable volume chambers interconnected by an orifice or passageway through which hydraulic fluid is displaced and by which such fluid is throttled to an extent that it is a function of the size of the orifice. Most such dampers are of a purely passive type that undergo extension and compression, which generate damping forces, but only in response to the relative movement of the spaced members (such as the seat and base components of an automobile) interconnected by the damper. The damping forces of passive dampers always oppose the relative movement and will under certain operational conditions that undesirably amplify, rather than attenuate the transmission of vibrations and forces between the seat and base interconnected by the damper.

Seat dampers can be passive, active, or semi-active dampers. Semi-active dampers are discussed herein. A semi-active damper resembles a passive one in that it does not include a pump or other source of pressurized fluid. A semi-active damper can only generate damping forces in response to and in opposition to relative movement between the members interconnected by it.

A semi-active damper resembles an active one in its inclusion of a mechanism and control system that controls the damping forces generated by the damper. More specifically, a semi-active damper continuously varies the magnitude of the damping force generated during operation by relative movement between the members interconnected by the damper. Such control may be realized by using an adjustable valve device in association with the orifice or passageway interconnecting the variable volume chambers of the damper, together with a controller for dynamically adjusting the valve during damper operation.

Simple semi-active dampers have long been employed for special purposes, such as to prevent their bottoming-out during extreme extension and/or compression. While these dampers may be satisfactory for specific limited purposes, the degree of vibration attenuation that they achieve is not significantly different from the attenuation realized by passive dampers and does not approach the attenuation realized by active ones. What is needed is a semi-active damper system that smooths out the jerk.

SUMMARY OF THE INVENTION

In one aspect, a method of controlling the damping force of a seat damper positioned between the seat and the base, the seat damper having a seat controller providing control thereto is provided. The method comprises measuring an absolute acceleration ($a_{abs}$) of the seat or base and generating an acceleration signal. The method includes measuring an unscaled relative displacement ($x_{rel\_unscaled}$) of the seat relative to the base and generating a displacement signal. The method includes calculating a maximum unscaled displacement ($x_{max\_unscaled}$) and a minimum unscaled displacement ($x_{min\_unscaled}$) from an autocalibration subprocess. The method includes calculating a relative scaled displacement ($x_{rel\_scaled}$), a maximum scaled displacement ($x_{max\_scaled}$), and a minimum scaled displacement ($x_{min\_scaled}$) using a standardized scaling subprocess. The method includes calculating an absolute velocity ($V_{abs\_seat}$) of the seat and a relative velocity ($V_{rel}$) of the seat relative to the base from a signal processing subprocess using the absolute acceleration ($a_{abs}$) and the scaled relative displacement ($x_{rel\_scaled}$). The method also includes using the plurality of input values for simultaneously determining a maximum endstop control signal ($u_{ES}$) and a skyhook control signal ($u_{skyhook}$), wherein the maximum endstop control signal ($u_{ES}$) is determined by simultaneously running an absolute ellipse endstop control process generating an absolute EEC endstop control signal ($Ctrl_{Ellipse\_abs}$), a relative ellipse endstop control process generating a relative EEC endstop control signal ($Ctrl_{Ellipse\_rel}$), and an ESO2 endstop control process generating an endstop control signal ($Ctrl_{ESO2}$), wherein the maximum of the three is selected as the maximum endstop control signals ($u_{ES}$), wherein the skyhook control signal ($u_{skyhook}$) is determined by running a skyhook control process and generating a skyhook control output ($Ctrl_{skyhook}$) and running a rising edge filter process on the skyhook control output ($Ctrl_{skyhook}$). The method further includes aggregating the maximum endstop control signal ($u_{ES}$) and the skyhook control signal ($u_{skyhook}$) to determine a desired seat performance by testing whether a sum of the maximum endstop control signal ($u_{ES}$) and the skyhook control signal ($u_{skyhook}$) provides the desired seat performance, or a maximum between the maximum endstop control signal ($u_{ES}$) or the skyhook control signal ($u_{skyhook}$) provides desired seat performance. And the method includes generating a damping force control signal ($u_{ctrl}$) based upon the desired seat performance and controlling the seat damper.

DETAILED DESCRIPTION

Figure 1:
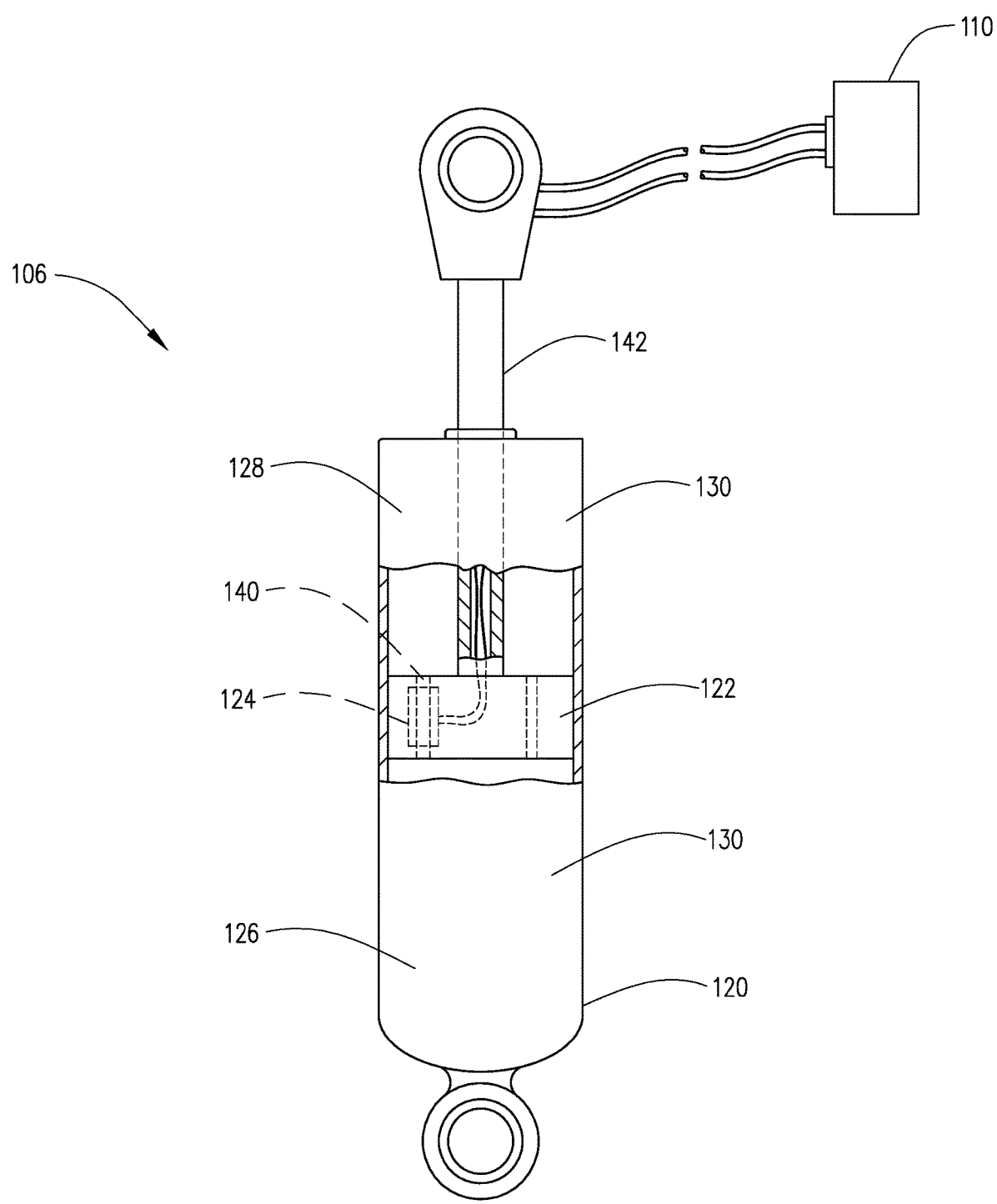
FIG. 1 is a representative section view example of a semi-active damper.

There are many vehicles which incorporate a damper between the seat and the mounting base to improve the ride for the person(s) occupying the seat. Passive dampers have a limited ability to react against the seat's natural resonance before beginning to transmit too much high frequency base excitation to the seat and seat occupant(s). Passive damper designs require a compromise between how much the seat moves at resonance, and how much high frequency motion is transmitted to the seat occupant(s).

Semi-active dampers can improve the performance of the seat in its middle operating range when compared with a passive seat by damping out the seat's natural resonance while still minimizing the amount of high frequency base excitation transmitted to the seat and rider.

However, there is still an issue when the seat approaches one of its endstops (i.e., full compression, or full extension). If the seat reaches an endstop, the hard impact is transmitted to the seat occupant(s). The current invention solves this problem by applying a progressively firmer damping factor to the seat as it approaches the endstop, thereby preventing the seat reaching the hard endstops, and hence preventing the transmission of that impact to the seat occupant(s).

Referring to FIGS. 1-3D, a seat damper system is illustrated and generally designated as seat damper system 100. Seat damper system 100 has seat 102, base 104, damper 106, spring 108, and system controller 110. Spring 108 provides vertical support for seat 102 while permitting vertical movement between it and base 104. In the non-limiting example of FIGS. 2-3D, support arms 109 move horizontally as seat 102 moves vertically. System controller 110 may be positioned on seat 102, base 104, or any other location that allows it to control seat damper system 100.

Seat 102 has at least one sensor 112 positioned thereon which is capable of providing vertical acceleration data for seat 102 and/or at least one sensor 114 positioned thereon which is capable of providing vertical displacement data for seat 102 relative to base 104. Base 104 may also have at least one sensor 116 positioned thereon which is capable of detecting vertical displacement of base 104 and may also have at least one more sensor 118 positioned thereon which is capable of detecting acceleration of base 104.

In a non-limiting example, damper 106 is a semi-active damper with controllable damping. Damper 106 is controlled by system controller 110. Damper 106 has a cylinder 120 with piston 122 movably disposed therein. Damper 106 further includes electrically adjustable valve 124 controlled by system controller 110 for varying the operating condition of valve 124 in accordance with a hereinafter discussed control policy and signal data received from sensors 112, 114, 116, and/or 118. Damper 106 has at least a first chamber 126 and a second chamber 128. Fluid 130 is in both first and second chambers 126, 128. Although damper 106 is discussed as being a semi-active damper using fluid 130, damper 106 can be a conventional hydraulic damper that uses hydraulic fluid, or it can be a magnetorheological (MR) damper with MR fluid in the first and second chambers 126, 128. If it is a MR damper, then the associated MR control system (not shown) known to those having skill in the art will also be associated with damper 106.

Figure 2:
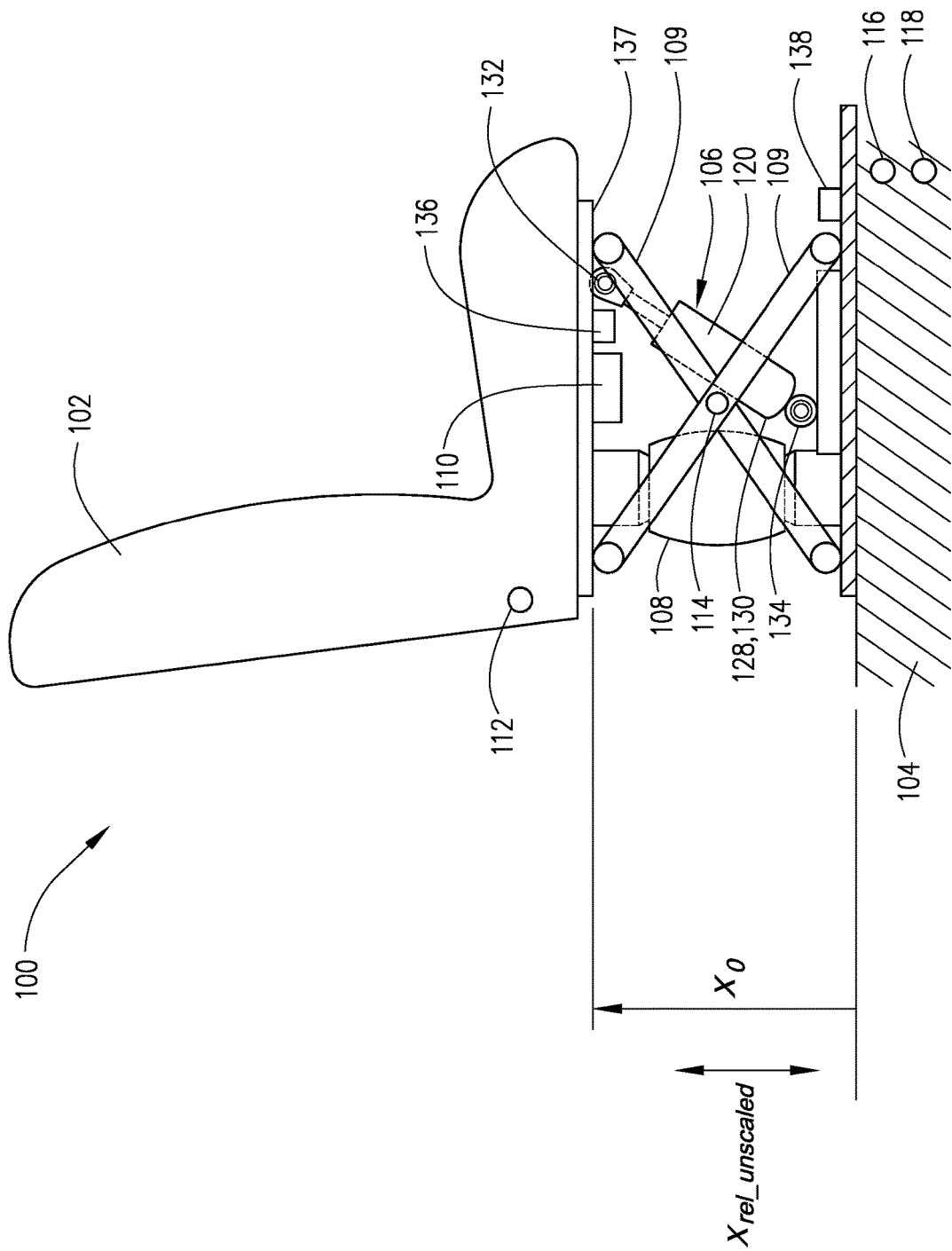
FIG. 2 is a schematic example of the semi-active damper of FIG. 1 installed on a seat.

As illustrated, damper 106 is secured to seat 102 on piston rod upper end 132 and is secured to base 104 on cylinder lower end 134. Upper snubber 136 and lower snubber 138 are generally illustrated in FIGS. 2-3B. The snubbers are physical bumpers that soften the endstops. The snubbers are the precursor to a full metal stop. Snubbers are present in many seat configurations. Some seats have snubbers in both compression and extension while others may only use snubbers in one endstop. Upper snubber 136 is compressible to absorb a maximum travel of damper 106 as the seat 102 travel is extending and lower snubber 138 compresses to absorb a minimum travel of damper 106 as the seat 102 travel is compressing. The actual location of the upper and lower snubbers 136, 138 is a design choice.

Vertical movement between seat 102 and base 104 displaces fluid 130 through valve 124 and associated conduit 140 interconnecting the first and second chambers 126, 128, which are separated by piston 122 when it is movably disposed within cylinder 120. As depicted in FIG. 1, rod 142 of piston 122 is positioned to move piston 122 such that the amount of fluid 130 displaced between first and second chambers 126, 128 is the same irrespective of whether the displacement is produced by compression or extension of damper 106.

Electrically adjustable valve 124 is rapidly adjustable between at least two different operating positions or conditions. In its first operating condition, electrically adjustable valve 124 significantly throttles or restricts fluid flow through conduit 140. This results in the generation of significant damping forces which, in keeping with those generated by any passive or semi-active damper, oppose the then transpiring relative movement of seat 102 that has caused the flow-producing relative movement between piston 122 and cylinder 120. In its second operating condition, electrically adjustable valve 124 is fully open and produces only minimal damping. When electrically adjustable valve 124 is in its second condition, the best achievable result is a minimal damping force approaching zero. Very rapid adjustive transitions from one to the other of the operating conditions of electrically adjustable valve 124 may be produced by control signals transmitted to the valve from system controller 110.

Figure 3A:
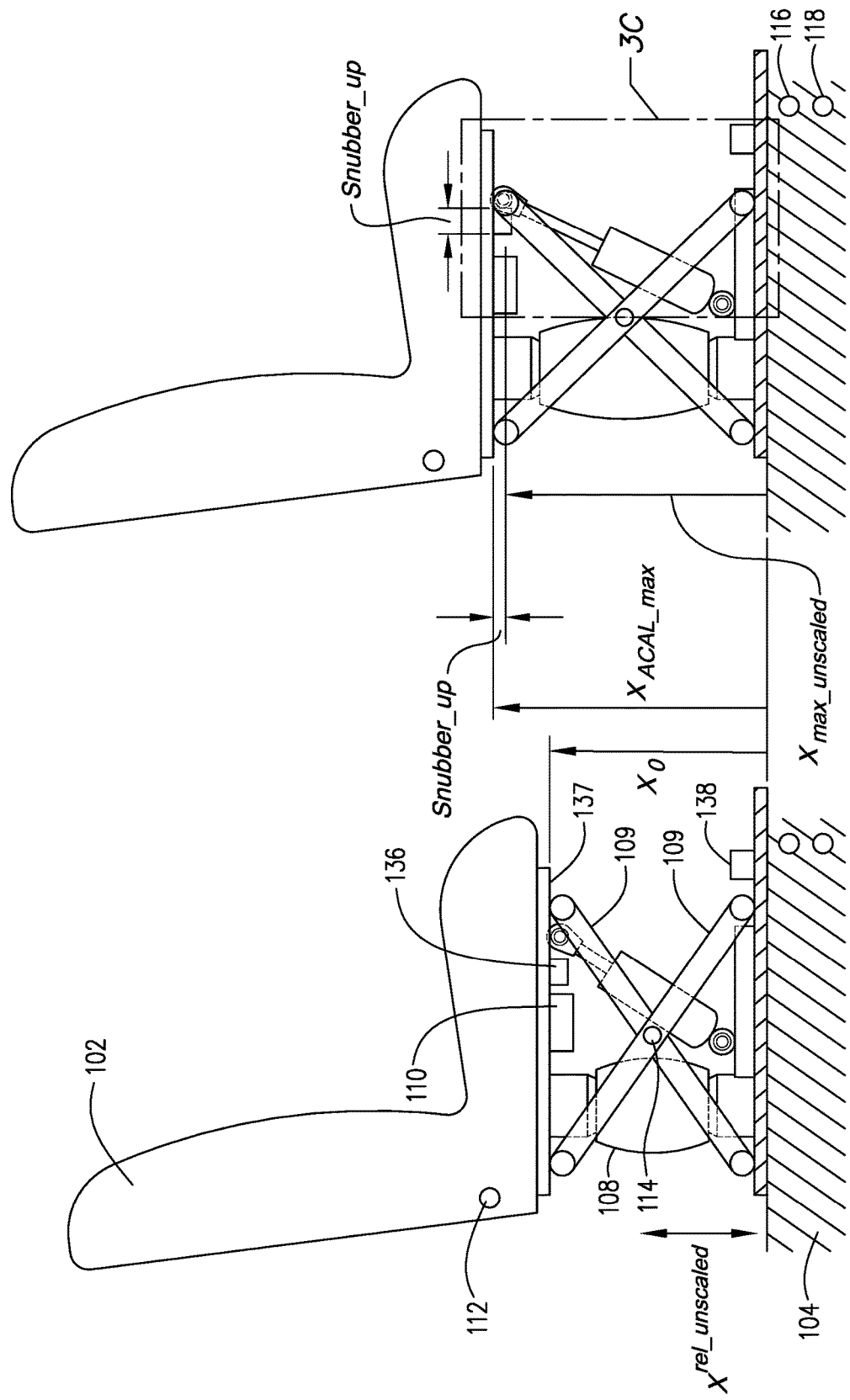
FIG. 3A is a schematic example of the seat of FIG. 2 in a neutral relative displacement $x_0$ position being compared to the seat of FIG. 2 extending.
Figure 3B:
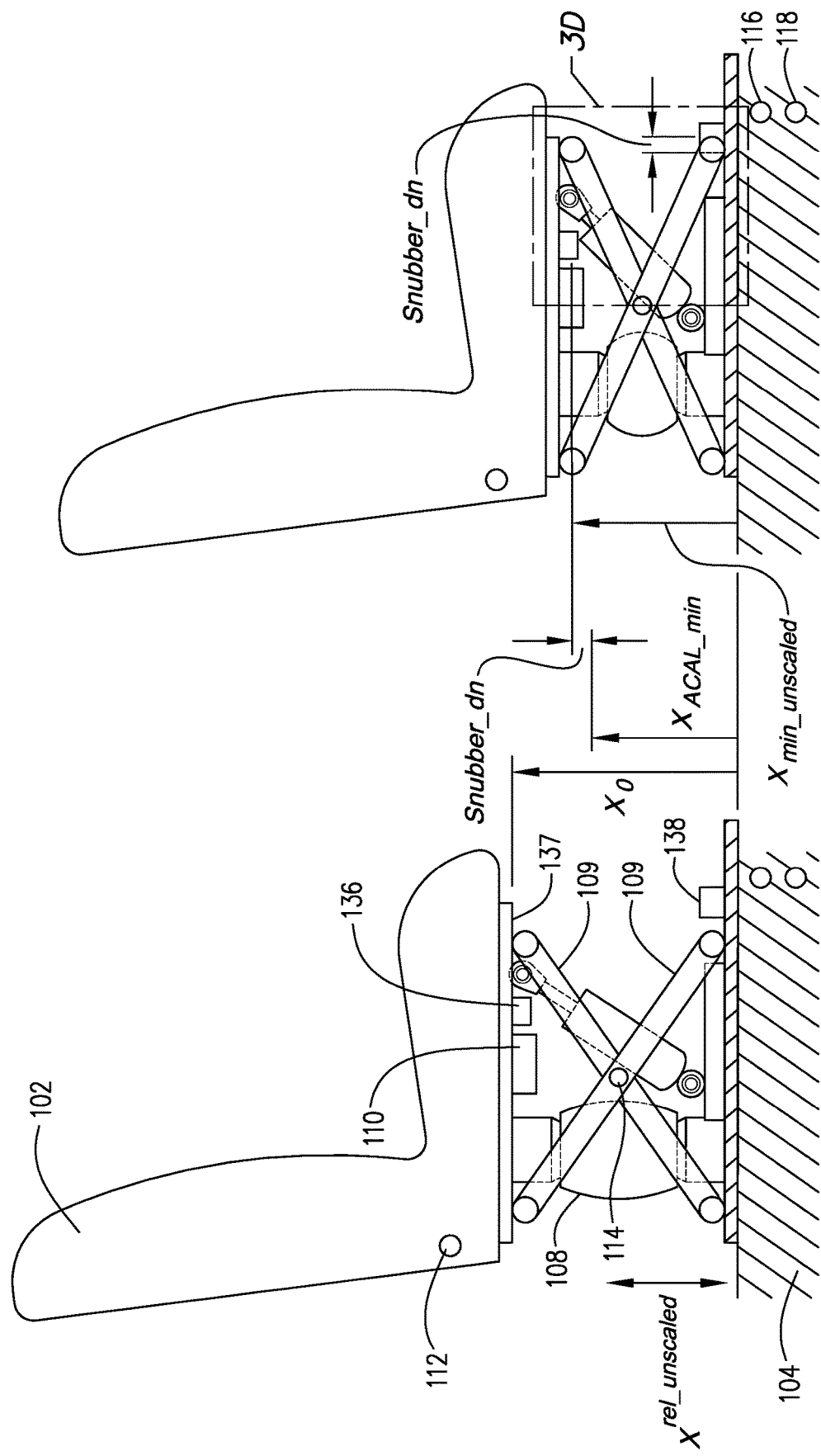
FIG. 3B is a schematic example of the seat of FIG. 2 in a neutral relative displacement $x_0$ position being compared to the seat of FIG. 2 compressing.
Figure 3D:
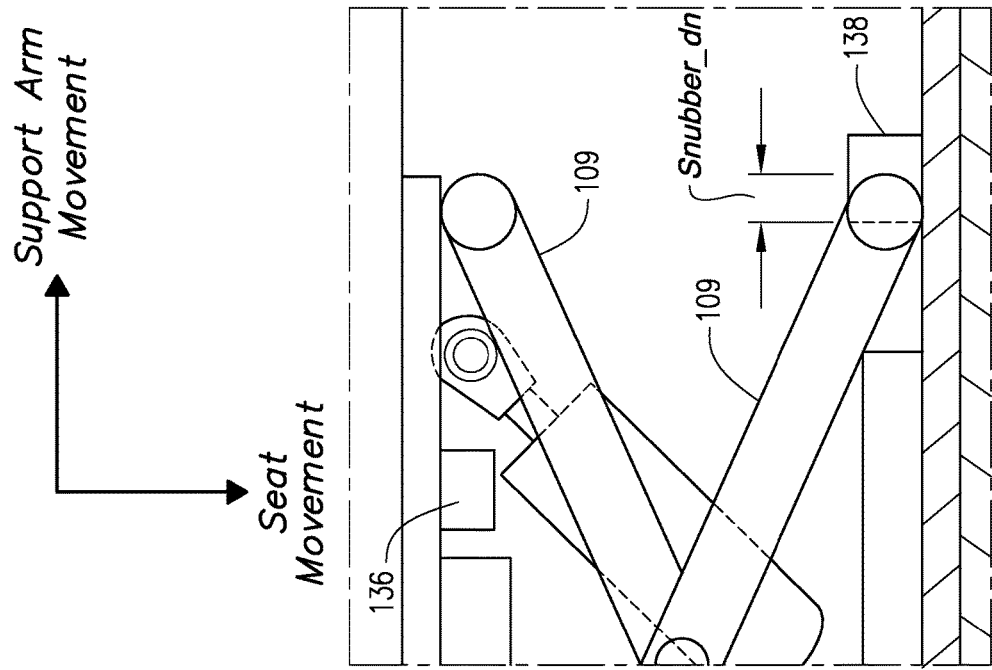
FIG. 3D is a detail view of the upper and lower snubbers for the seat in compression taken from FIG. 3B

Referring generally to FIGS. 2-3D, system controller 110 uses data from sensors 114 and/or 116 to receive data regarding the unscaled relative displacement $x_{rel\_unscaled}$ and the relative velocity $V_{rel}$ of seat 102. The unscaled relative displacement $x_{rel\_unscaled}$ is the raw digital unscaled units for the relative displacement of seat 102 relative to base 104. The unscaled relative displacement $x_{rel\_unscaled}$ is in nondimensional digital units. The nondimensional digital units are determined by the full stroke of the sensor divided by digital resolution. The absolute velocity $V_{abs\_seat}$ of seat 102 is determined by taking the integration of sensor 112 or through a sensor fusion subprocess. The absolute velocity $V_{abs\_seat}$ of seat 102 can also be measured or calculated from the motion data from the acceleration sensors 112, 118 and/or displacement sensors 114, 116.

When system controller 110 is installed on seat 102 or base 104, and sensor 114 is installed on seat 102 or within system controller 110, the relative velocity $V_{rel}$ is obtained directly from sensor 114. The relative velocity $V_{rel}$ is obtained by taking the derivative of the unscaled relative displacement $x_{rel\_unscaled}$ over time.

When system controller 110 is installed on the base 104, and sensor 112 is installed within the system controller, the base absolute velocity, $V_{abs\_base}$ is obtained by taking the integral of the acceleration output from sensor 112. To determine absolute velocity $V_{abs\_seat}$ of seat 102, the seat relative velocity $V_{rel}$ is added to the base absolute velocity $V_{abs\_base}$.

The relative velocity $V_{rel}$ and the absolute velocity $V_{abs\_seat}$ of seat 102 are mathematically represented by equations 1-3.

$$V_{rel} = d(x_{rel\_scaled})/dt \quad \text{Eq. 1}$$

$$V_{rel} = V_{abs\_seat} - V_{abs\_base} \quad \text{Eq. 2}$$

$$V_{abs\_seat} = V_{abs\_base} + V_{rel} \quad \text{Eq. 3}$$

Figure 3C:
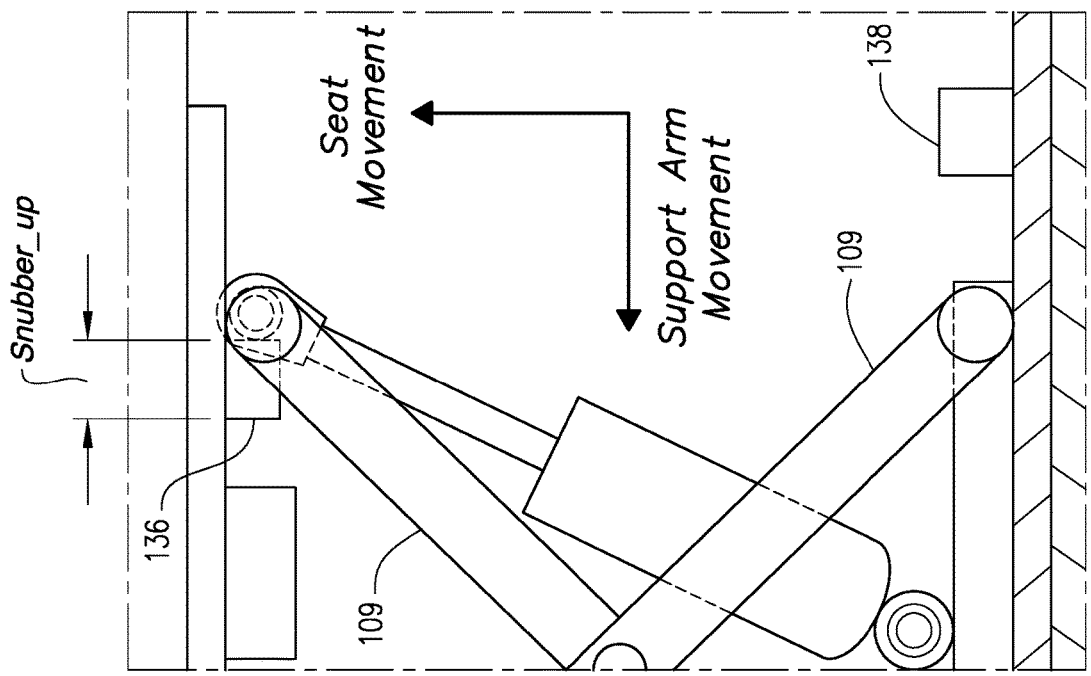
FIG. 3C is a detail view of the upper and lower snubbers for the seat in extension taken from FIG. 3A.

Referring to FIGS. 3A-3D, seat 102 is positioned on the left side of the figure in a neutral state having an initial neutral relative displacement $x_0$ relative to base 104 when seat 102 has no load or movement. In FIGS. 3A and 3C, seat 102 is extending vertically with the maximum displacement $x_{ACAL\_max}$ being the maximum distance for 100% metal extension of damper 106 which is measured between base 104 and lower edge 137 of seat 102. The maximum unscaled displacement $x_{max\_unscaled}$ is the distance between base 104 and an initial touch of upper snubber 136 by support arm 109 when it begins to compress into upper snubber 136 when damper 106 is fully extended. FIGS. 3A and 3C, illustrate snubber thickness Snubber_up which is the displacement thickness of upper snubber 136 measured from an initial touch by support arm 109 beginning to compress into upper snubber 136 and a full penetration of support arm into upper snubber 136. The maximum displacement $x_{ACAL\_max}$ is also illustrated in FIGS. 3A and 5E as being the maximum unscaled displacement $x_{max\_unscaled}$ plus snubber thickness Snubber_up. FIG. 3C illustrates the vertical movement of seat 102 and the horizontal movement of support arm 109.

In FIGS. 3B and 3D, seat 102 is compressing with the minimum displacement $x_{ACAL\_min}$ being the minimum distance for the 100% metal compression of damper 106. The minimum unscaled displacement $x_{min\_unscaled}$ is the distance between base 104 and an initial touch of lower snubber 138 by support arm 109 when it begins to compress into lower snubber 138 when damper 106 is fully compressed. FIGS. 3B and 3D, illustrate snubber thickness Snubber_dn which is the displacement thickness of lower snubber 138 measured from the initial touch by support arm 109 beginning to compress lower snubber 138 and a full penetration of support arm into lower snubber 138. The minimum displacement $x_{ACAL\_min}$ is also illustrated in FIGS. 3B and 5E as being the minimum unscaled displacement $x_{min\_unscaled}$ minus the snubber thickness Snubber_dn. FIG. 3D illustrates the vertical movement of seat 102 and the horizontal movement of support arm 109.

The scaled relative displacement $x_{rel\_scaled}$ represented in Equation 4 further includes the working range displacement $x_{PDIF\_Working\_range}$ and the working minimum displacement $x_{PDIF\_Working\_min}$, which are both explained in the standardized scaling subprocess 148 section below.

$$x_{rel\_scaled} = \left[\frac{x_{rel\_unscaled} - x_{min\_unscaled}}{x_{max\_unscaled} - x_{min\_unscaled}}\right] * x_{PDIF\_Working\_Range} + x_{PDIF\_Working\_min} \quad \text{Eq. 4}$$

Although the value of the relative displacement $x_{rel\_scaled}$ is between $x_{max\_scaled}$ and $x_{min\_scaled}$, it is not a mathematical value. Instead, these are point quantities without a reference scale.

Referring to FIGS. 2-3D, sensors 112 and 118 may be accelerometers, but any sensor capable of providing data on vertical acceleration of seat 102 or base 104 will work. Similarly, sensors 114 and 116 may be a linear variable differential transformer (LVDT) or a linear velocity transducer (LVT), but any sensor capable of providing vertical displacement of seat 102 or base 104 will work. Sensors 112, 114, 116, 118 provide data to system controller 110. The raw data from the displacement sensors 114, 116 provide for the unscaled relative displacement $x_{rel\_unscaled}$.

In the illustrated seat configuration, system controller 110 may also use data from sensors 112 and/or 114 and sensors 116 and/or 118 to determine the displacement of seat 102 relative to base 104 and to determine the absolute velocity $V_{abs\_seat}$ of seat 102. However, system controller 110 can also use the same sensors 112 and/or 114 to obtain the absolute acceleration $a_{abs}$ of base 104.

In addition, system controller 110 has a control policy that provides for the semi-active control of damper 106. As illustrated in FIGS. 1-3D, the system controller may calculate and/or store data that includes the relative unscaled displacement $x_{rel\_unscaled}$, the maximum unscaled displacement $x_{max\_unscaled}$, the minimum unscaled displacement $x_{min\_unscaled}$, the relative scaled displacement $x_{rel\_scaled}$, the maximum scaled displacement $x_{max\_scaled}$, the minimum scaled displacement $x_{min\_scaled}$, the absolute velocity $V_{abs\_seat}$, and the relative velocity $V_{rel}$ of seat 102. The system controller 110 may also calculate and/or store data of the absolute acceleration $a_{abs}$ of seat 102.

Data measured by sensors 112, 114, 116, and/or 118, and calculations executed in system controller 110 are stored in flash memory (not shown) and/or in nonvolatile random-access memory (NVRAM) (not shown). In addition, the flash memory or NVRAM will also store data from previous seat damper system 100 operations as well as data calculated in the various subprocesses described hereinbelow. Additional data may be entered by the original equipment manufacturer (OEM) in a parameter data item file (PDIF) that is stored in the flash memory or the NVRAM. The types of data stored hereinbelow are measured, calculated, and/or stored as described in the individual processes or subprocesses.

Figure 4:
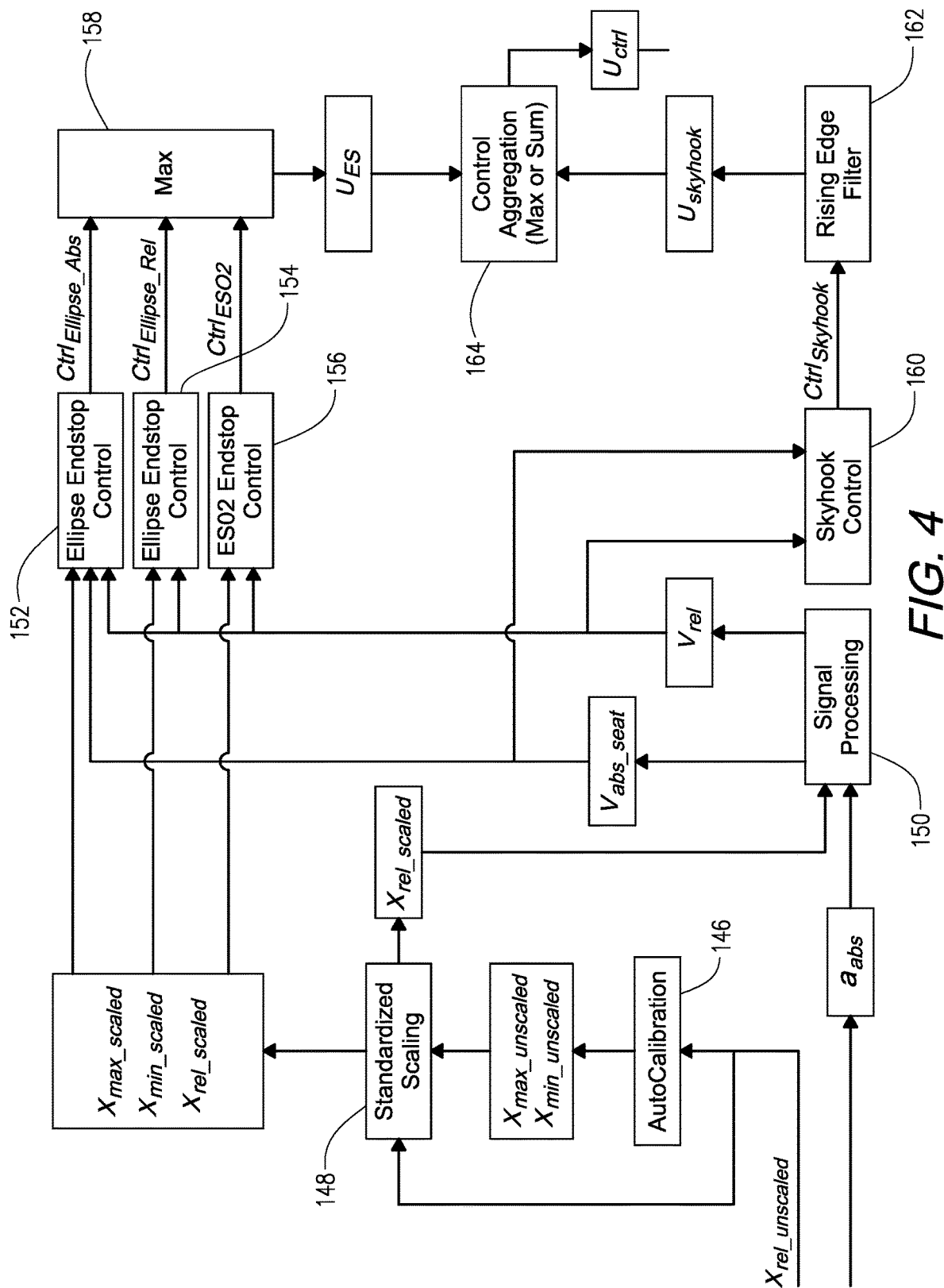
FIG. 4 is a flowchart of the current inventive process.

Referring to FIG. 4, the top-level process flowchart is illustrated. The process illustrated in FIG. 4 is all executed in the system controller 110. Each of the subprocesses are detailed below.

In the process flow chart illustrated in FIG. 4, the unscaled relative displacement $x_{rel\_unscaled}$ of seat 102 is communicated to AutoCalibration subprocess 146. The outputs from AutoCalibration subprocess 146 are the maximum unscaled displacement $x_{max\_unscaled}$ and the minimum unscaled displacement $x_{min\_unscaled}$ of seat 102.

The unscaled relative displacement $x_{rel\_unscaled}$ of seat 102 is also communicated to a standardized scaling subprocess 148 along with the maximum unscaled displacement $x_{max\_unscaled}$ and the minimum unscaled displacement $x_{min\_unscaled}$ of seat 102. The output from standard scaling subprocess 148 is the scaled relative displacement $x_{rel\_scaled}$, the maximum scaled displacement $x_{max\_scaled}$, and the minimum scaled displacement $x_{min\_scaled}$ of seat 102.

The absolute acceleration $a_{abs}$ of seat 102 or base 104 is communicated to signal processing subprocess 150 along with the scaled relative displacement $x_{rel\_scaled}$ of seat 102, which is illustrated as being communicated from standardized scaling subprocess 148. The scaled relative displacement $x_{rel\_scaled}$ of seat 102 may be directly communicated to signal processing subprocess 150. The outputs from signal processing subprocess 150 are the absolute velocity $V_{abs\_seat}$ of seat 102 and the relative velocity $V_{rel}$ of seat 102.

The maximum scaled displacement $x_{max\_scaled}$, the minimum scaled displacement $x_{min\_scaled}$, and the scaled relative displacement $x_{rel\_scaled}$ are all communicated from a standardized scaling subprocess to absolute ellipse endstop control subprocess 152, relative ellipse endstop control subprocess 154, and ESO2 endstop control subprocess 156. In addition, the absolute velocity $V_{abs\_seat}$ of seat 102 is communicated to absolute ellipse endstop control subprocess 152, and the relative velocity $V_{rel}$ is communicated to absolute ellipse endstop control subprocess 152, relative ellipse endstop control subprocess 154, and ESO2 endstop control subprocess 156.

The output for absolute ellipse endstop control subprocess 152 is an endstop control signal $Ctrl_{Ellipse\_abs}$. The output for relative ellipse endstop control subprocess 154 is an endstop control signal $Ctrl_{Ellipse\_rel}$. And the output for ESO2 endstop control subprocess 156 is an endstop control signal $Ctrl_{ESO2}$. The endstop control signals from the absolute ellipse endstop control subprocess 152, the relative ellipse endstop control subprocess 154, and the ESO2 endstop control subprocess 156 are communicated to the maximum endstop control subprocess 158. The output from the max endstop control subprocess 158 is the maximum endstop control signal $u_{ES}$, which is the maximum value of endstop control signals $Ctrl_{Ellipse\_abs}$, $Ctrl_{Ellipse\_rel}$, and/or $Ctrl_{ESO2}$.

The absolute velocity $V_{abs\_seat}$ of seat 102 and the relative velocity $V_{rel}$ are communicated to the skyhook control subprocess 160. The output from the skyhook control subprocess 160 is a skyhook control signal $Ctrl_{skyhook}$. The skyhook control signal $Ctrl_{skyhook}$ is communicated to the rising edge filter subprocess 162. The output from the rising edge filter subprocess 162 is a skyhook control signal $u_{skyhook}$.

The maximum endstop control signal $u_{ES}$ and the skyhook control signal $u_{skyhook}$ are communicated to the control aggregation subprocess 164. The output from the control aggregation subprocess 164 is the damper control signal $u_{ctrl}$ used to provide control input to damper 106. The individual subprocesses are further explained below.

AutoCalibration Subprocess

Figure 5A:
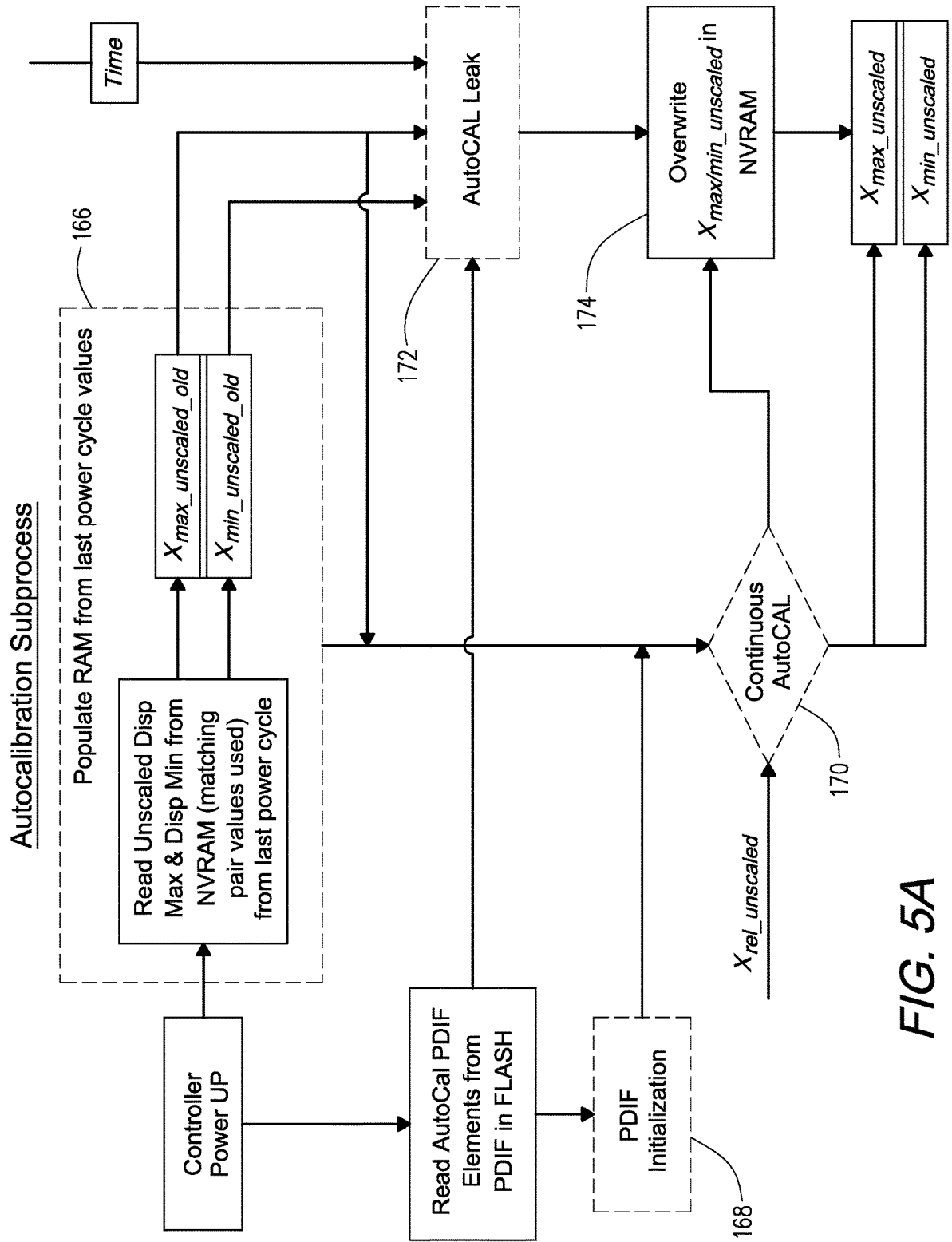
FIGS. 5A-5D are flowcharts of an autocalibration subprocess.
Figure 5B:
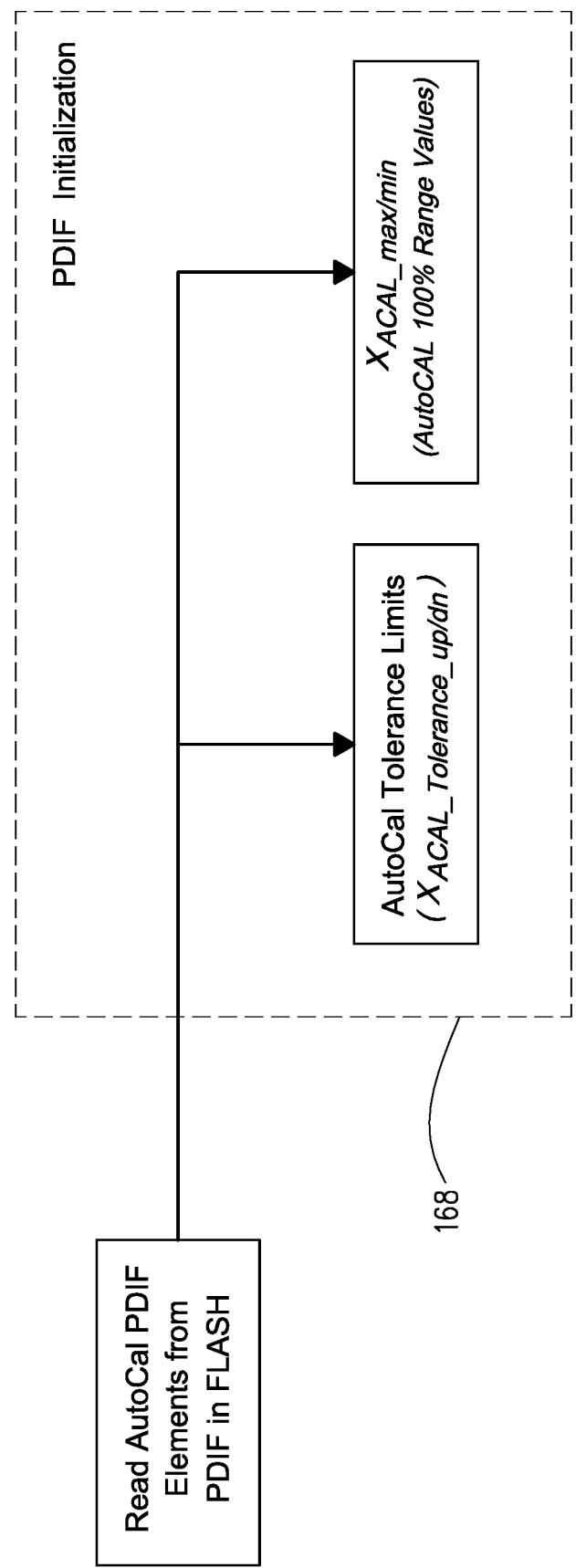
Figure 5C:
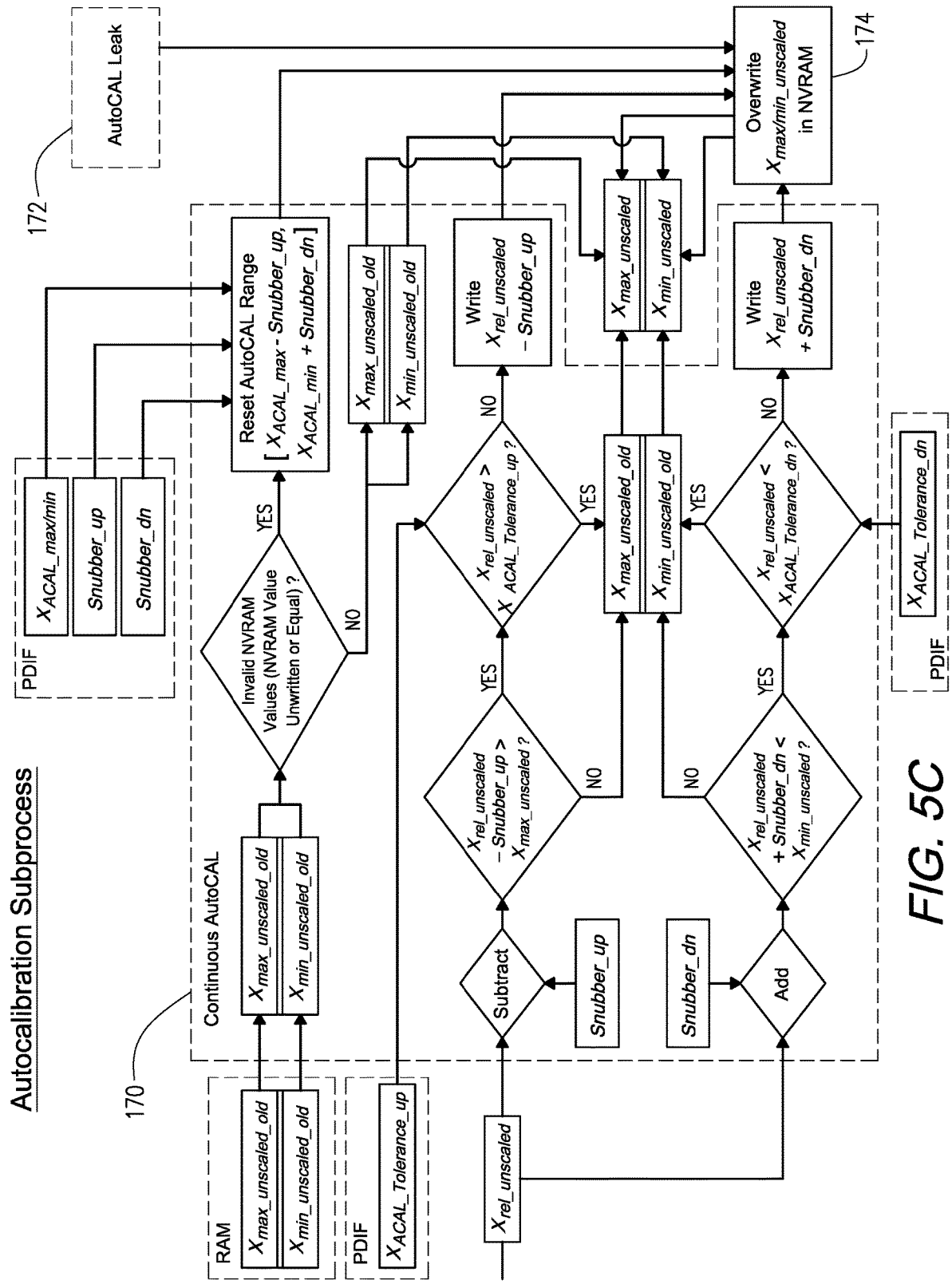
Figure 5D:
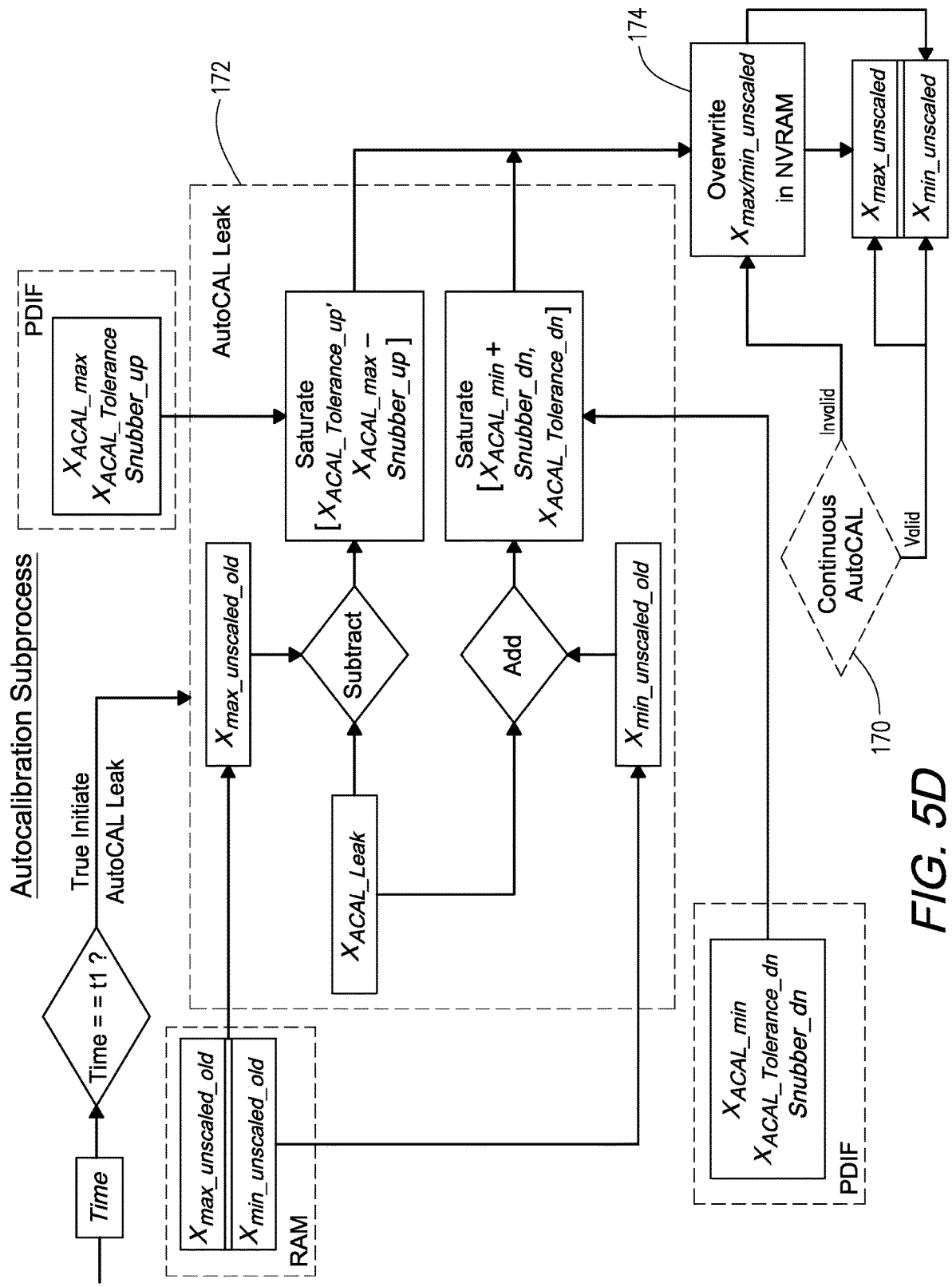
Figure 5E:
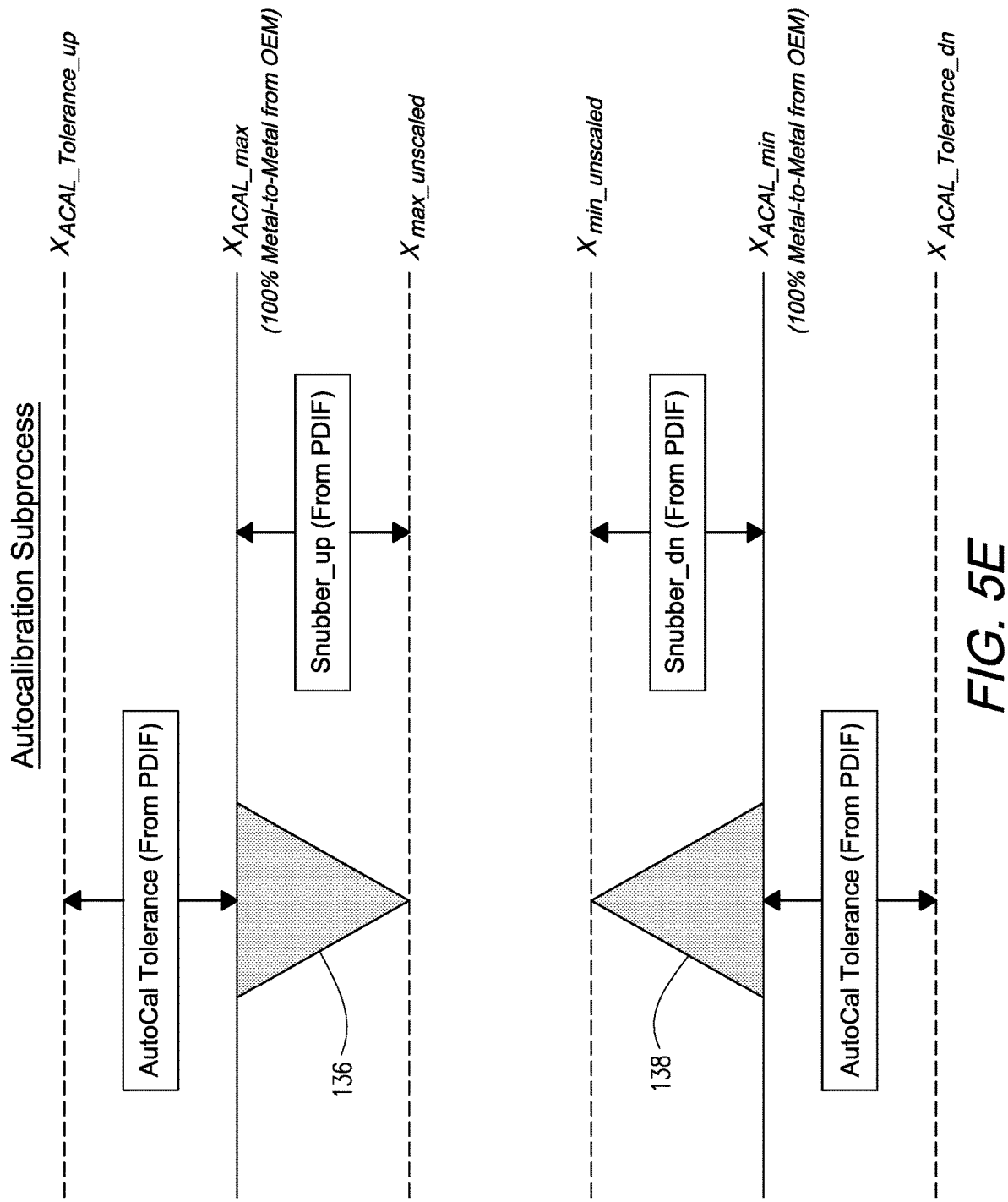
FIG. 5E is a schematic of the autocalibration subprocess.

The AutoCalibration Subprocess 146 is illustrated in FIGS. 5A-5E. There are four further subprocesses within the AutoCalibration Subprocess 146 that are illustrated in FIGS. 5B-5D and include the population of the RAM from the last power cycle values subprocess 166, a PDIF initialization subprocess 168, a continuous AutoCAL subprocess 170, an AutoCAL Leak subprocess 172, and an overwrite subprocess 174. FIG. 5E illustrates the AutoCAL Tolerance relationship to the elements used in the AutoCalibration Subprocess 146.

PDIF initialization subprocess 168 is initiated upon the powering up of system controller 110. This subprocess uses the AutoCAL PDIF elements from the PDIF that are stored in flash memory and populates the autocalibration maximum and minimum displacement $x_{ACAL\_max/min}$ as well as the autocalibration tolerance up or down displacement $x_{ACAL\_Tolerance\_up/dn}$. Although flash memory is referenced, any memory storage device capable of storing the AutoCAL PDIF elements will work. The autocalibration tolerance up or down displacement $x_{ACAL\_Tolerance\_up/dn}$ is the raw unscaled values depicting the combination of the 100% metal stop plus a tolerance percentage that is defined in the PDIF by the OEM.

The autocalibration maximum and minimum displacement $x_{ACAL\_max/min}$ are the 100% maximum and minimum raw unscaled values of the 100% metal extension/compression stops entered by the OEM into the PDIF. The autocalibration tolerance AutoCAL_Tolerance is the maximum and minimum allowable unscaled relative displacement inputs from the sensor. Values outside of these bounds are considered invalid and indicate some defect of the system.

Additionally, nonvolatile random-access memory (NVRAM) of system controller 110 has the values stored from the previous/last power cycle. The previously stored maximum unscaled displacement $x_{max\_unscaled\_old}$ and the minimum unscaled displacement $x_{min\_unscaled\_old}$, the matching pair values, are read from NVRAM and are communicated to the continuous AutoCAL 170 and the AutoCAL Leak 172 subprocesses. Matching pair values means the code looks at the NVRAM spaces saved for these values and uses the values in NVRAM only if there are duplicate copies of the same value in NVRAM. This ensures values in NVRAM are valid and are from a good past write to NVRAM. One can also use the checksum or CRC of the section to ensure its validity.

Referring to FIG. 5C, continuous AutoCAL 170 is a decision block with sub-decision blocks within it. For illustration purposes only, FIG. 5C shows continuous AutoCAL 170 decision block as a rectangle. In continuous AutoCAL subprocess 170, a determination is made as to whether the NVRAM values are invalid. That is, a question is asked if the NVRAM values are unwritten or equal? This determination uses the maximum unscaled displacement $x_{max\_unscaled\_old}$ and the minimum unscaled displacement $x_{min\_unscaled\_old}$ from the previous session. If the NVRAM values are valid the maximum unscaled displacement $x_{max\_unscaled\_old}$ and the minimum unscaled displacement $x_{min\_unscaled\_old}$ are retained and the maximum unscaled displacement $x_{max\_unscaled\_old}$ is assigned to be the maximum unscaled displacement $x_{max\_unscaled}$ and the minimum unscaled displacement $x_{min\_scaled\_old}$ is assigned to be the minimum unscaled displacement $x_{min\_unscaled}$. If the NVRAM values are invalid the AutoCAL Range is reset to the OEM loaded values of autocalibration maximum displacement $x_{ACAL\_max}$ minus the upper snubber 136 thickness Snubber_up value and autocalibration minimum displacement $x_{ACAL\_min}$ plus the lower snubber 138 thickness Snubber_dn value. The upper snubber 136 thickness Snubber_up and the lower snubber 138 thickness Snubber_dn values are linear displacement digital units entered by the OEM and are based upon the thickness of the elastomeric snubbers. The Reset AutoCAL Range is written back to NVRAM.

As will be explained below in the standardized scaling subprocess, the standardized range is any range that offers enough resolution to capture small movements between both ends of physical travel. The standardized range values stored in the PDIF include the working minimum displacement and the working range displacement. In one non-limiting example, a working minimum displacement is set as 4,000 units and a working range displacement is set at 24,000 units. Using these units, minimum scaled displacement $x_{min\_scaled}$ scaled will be 4,000 and the maximum scaled displacement $x_{max\_scaled}$ will be 28,000.

The continuous AutoCAL subprocess 170 also uses information from the NVRAM and the PDIF and includes the unscaled relative displacement $x_{rel\_unscaled}$. For the snubber up state, once the inputs are determined the upper snubber 136 thickness Snubber_up value is subtracted from the unscaled relative displacement $x_{rel\_unscaled}$. For mathematical illustration purposes only, this is referred to as $Value_{CA}$ 1. Next, determine if the unscaled relative displacement $x_{rel\_unscaled}$ minus the upper snubber 136 thickness Snubber_up value is greater than the maximum unscaled displacement $x_{max\_unscaled}$. If the answer is no, then maximum unscaled displacement $x_{max\_unscaled\_old}$ is assigned to be the maximum unscaled displacement $x_{max\_unscaled}$. If the answer is yes, the process continues, and the question is asked if the unscaled relative displacement $x_{rel\_unscaled}$ is greater than the autocalibration tolerance up displacement $x_{ACAL\_Tolerance\_up}$. If the answer is no, then the value of unscaled relative displacement $x_{rel\_unscaled}$ minus the upper snubber 136 thickness Snubber_up value is written back to NVRAM. If the answer is yes, then maximum unscaled displacement $x_{max\_unscaled\_old}$ is assigned to be the maximum unscaled displacement $x_{max\_unscaled}$.

For the snubber down state, the continuous AutoCAL subprocess 170 also adds the lower snubber 138 thickness Snubber_dn to the unscaled relative displacement $x_{rel\_unscaled}$. For mathematical illustration purposes, this is referred to as $Value_{CA}$ 2. Next, determine if the unscaled relative displacement $x_{rel\_unscaled}$ plus the lower snubber 138 thickness Snubber_dn value is less than the minimum unscaled displacement $x_{min\_unscaled}$. If the answer is no, then the minimum unscaled displacement $x_{min\_unscaled\_old}$ is assigned to be the minimum unscaled displacement $x_{min\_unscaled}$. If the answer is yes, the process continues, and the question is asked if the unscaled relative displacement $x_{rel\_unscaled}$ is less than the autocalibration tolerance down displacement $x_{ACAL\_Tolerance\_dn}$. If the answer is no, then the value of unscaled relative displacement $x_{rel\_unscaled}$ plus the lower snubber 138 thickness Snubber_dn value is written back to NVRAM. If the answer is yes, then the minimum unscaled displacement $x_{min\_unscaled\_old}$ is assigned to be the minimum unscaled displacement $x_{min\_unscaled}$.

The equations for the continuous AutoCAL are:

$Value_{CA}1 = x_{rel\_unscaled} - Snubber\_up$  Eq. 5

Is $Value_{CA}1 > x_{max\_unscaled}$?  Eq. 6

Is $x_{rel\_unscaled} > x_{ACAL\_Tolerance\_up}$?  Eq. 7

$Value_{CA}2 = x_{rel\_unscaled} + Snubber\_dn$  Eq. 8

Is $Value_{CA}2 < x_{min\_unscaled}$?  Eq. 9

Is $x_{rel\_unscaled} < x_{ACAL\_Tolerance\_dn}$?  Eq. 10

Referring to FIG. 5D, the AutoCAL Leak subprocess 172 is initiated when time=t1 is true. Time t1 is an internal code counter that is started once system controller 110 is powered on. Time t1 counts to 65,000 and stops, and it is used for initialization event scheduling. Once initiated, the maximum unscaled displacement $x_{max\_unscaled\_old}$ and the minimum unscaled displacement $x_{min\_unscaled\_old}$ from the previous session are modified by a leakage value $x_{ACAL\_leak}$. The leakage value $x_{ACAL\_leak}$ is subtracted from the maximum unscaled displacement $x_{max\_unscaled\_old}$. For mathematical illustration purposes this value is referred to as $Value_{AL}$ 1. Leakage value is an unscaled digital value that is used to adjust erroneous calibrations that are too wide and is applied at the beginning of every power cycle.

The leakage value $x_{ACAL\_leak}$ is also added to the minimum unscaled displacement $x_{min\_unscaled\_old}$ from the previous session. For mathematical illustration purposes only, this value is referred to as $Value_{AL}2$. The leak value for the autocalibration maximum displacement $x_{ACAL\_max}$ is only written to NVRAM if it is less than or equal to the autocalibration tolerance up displacement $x_{ACAL\_Tolerance\_up}$ and greater than or equal to the autocalibration maximum displacement $x_{ACAL\_max}$ minus the upper snubber thickness Snubber_up. The leak value for the autocalibration minimum displacement $x_{ACAL\_min}$ is only written to NVRAM if it is greater than or equal to the autocalibration tolerance down displacement $x_{ACAL\_Tolerance\_Dn}$ and less than or equal to autocalibration minimum displacement $x_{ACAL\_min}$ plus the lower snubber 138 thickness Snubber_dn.

The equations for the AutoCAL leak are:

$Value_{AL}1 = x_{max\_unscaled\_old} - x_{ACAL\_Leak}$  Eq. 11

$Saturate = x_{ACAL\_Tolerance\_up}, x_{ACAL\_max} - Snubber\_up$  Eq. 12

$Value_{AL}2 = x_{min\_unscaled\_old} + x_{ACAL\_Leak}$  Eq. 13

$Saturate = x_{ACAL\_min} + Snubber\_dn, x_{ACAL\_Tolerance\_dn}$  Eq. 14

From the input from the continuous AutoCAL subprocess 170 and the AutoCAL Leak subprocess 172, the overwrite subprocess 174 selects the maximum value for the maximum unscaled displacement $x_{max\_unscaled}$ and the minimum value for the minimum unscaled displacement $x_{min\_unscaled}$. The different decisions described above for the continuous AutoCal subprocess 170 may result in the maximum unscaled displacement $x_{max\_unscaled\_old}$ and the minimum unscaled displacement $x_{min\_unscaled\_old}$ being assigned to be the maximum unscaled displacement $x_{max\_unscaled}$ and the minimum unscaled displacement $x_{min\_unscaled}$. When this occurs the overwrite subprocess 174 is bypassed. Otherwise, the outputs from the different decisions described above for the continuous AutoCal subprocess 170 follow the decision logic paths and are provided to the overwrite subprocess 174. The values are written to NVRAM or other designated memory.

Standardized Scaling Subprocess

Referring to FIG. 4, standardized scaling subprocess 148 receives the maximum unscaled displacement $x_{max\_unscaled}$ and the minimum unscaled displacement $x_{min\_unscaled}$ from AutoCalibration subprocess 146. The outputs from the standardized scaling subprocess 148 include the scaled relative displacement $x_{rel\_scaled}$, the maximum scaled displacement $x_{max\_scaled}$, and the minimum scaled displacement $x_{min\_scaled}$.

The standardized range is a range of displacement travel where the maximum and minimum ends of damper travel are assigned specific hard-coded values independent of raw displacement sensor range values. This provides the same digital resolution inside the algorithms and filters, and hence the values are independent of sensor 112, 114, 116, and/or 118 input resolutions.

Signal Processing Subprocess

Referring to FIG. 6A-6D, the Signal Processing subprocess 150 is illustrated with an input of the absolute acceleration $a_{abs}$ of seat 102 or base 104 and the scaled relative displacement $x_{rel\_scaled}$. The process can use the data from either a digital displacement sensor or an analog displacement sensor 114 and/or 116 and the process can use data from either a digital accelerometer or an analog accelerometer 112 and/or 118.

Figure 6A:
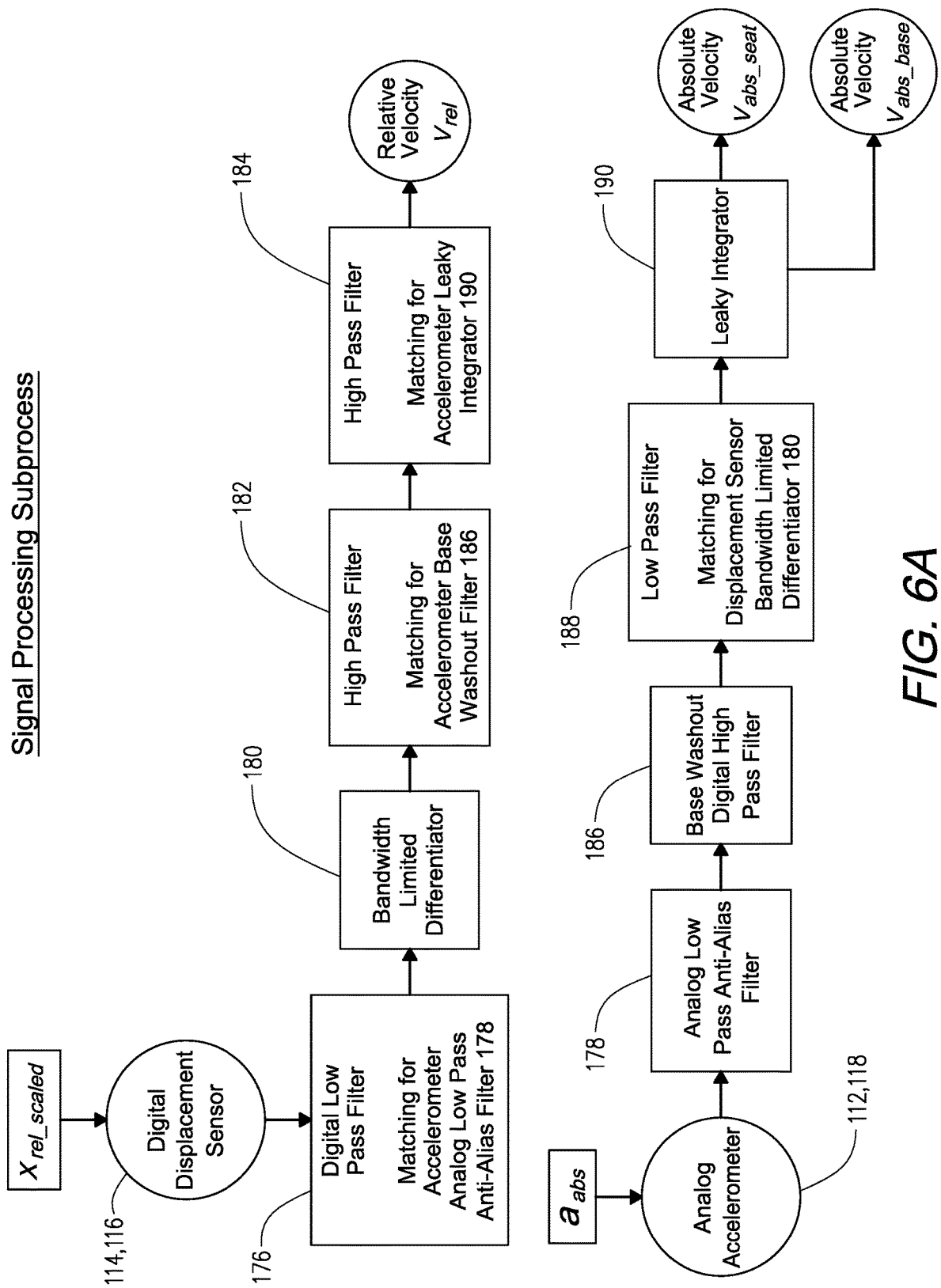
FIGS. 6A-6D illustrate a flowchart of a signal processing subprocess.

Referring to FIG. 6A, the digital displacement sensor 114 and/or 116 is illustrated as being paired with an analog accelerometer 112 and/or 118. In this configuration, the signal from the digital displacement sensor 114 and/or 116 is first processed through a digital low pass filter 176 to match the accelerometer's analog low pass anti-aliasing filter 178. The resultant signal from the digital displacement sensors 114 and/or 116 is processed through a bandwidth limited differentiator 180. The resultant signal from bandwidth limited differentiator 180 is processed through a high pass filter 182 to match the accelerometer base washout filter 186. The output from high pass filter 182 is processed through second high pass filter 184 and to match the accelerometer leaky integrator 190. The output from second high pass filter 184 is the relative velocity $V_{rel}$ of seat 102.

Still referring to FIG. 6A, the signal processing subprocess 150 uses the data from the analog accelerometer 112 and/or 118. The signal from the analog accelerometer 112 and/or 118 includes processing the signal with an analog low pass anti-aliasing filter 178. The resultant signal from the analog accelerometer 112 and/or 118 is processed through a base washout digital high pass filter 186. The resultant signal from base washout digital high pass filter 186 is processed through a low pass filter 188 to match with the displacement sensor 114, 116 bandwidth limited differentiator 180. The resultant signal is next processed by a leaky integrator 190 and produces an absolute velocity $V_{abs\_seat}$ of seat 102 and/or $V_{abs\_base}$ of base 104.

Figure 6B:
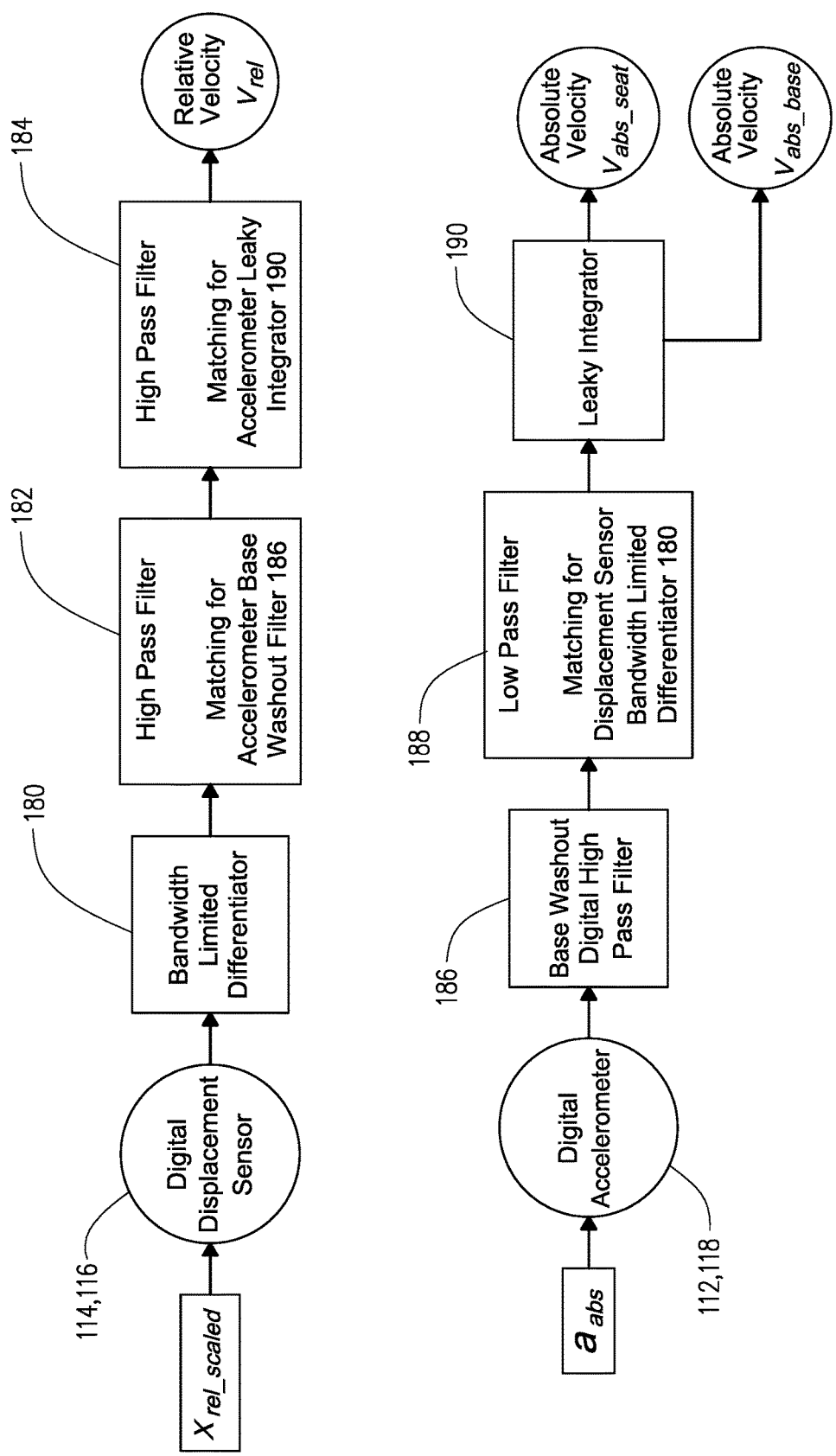

Referring to FIG. 6B, the digital displacement sensor 114 and/or 116 is illustrated as being paired with a digital accelerometer 112 and/or 118. There is no intermediate analog signal processing. The resultant signal from the digital displacement sensor 114 and/or 116 is processed through a bandwidth limited differentiator 180. The resultant signal from bandwidth limited differentiator 180 is processed through a high pass filter 182 to match the accelerometer base washout filter 186. The output from high pass filter 182 is processed through second high pass filter 184 to match to the accelerometer leaky integrator 190. The output from second high pass filter 184 is the relative velocity $V_{rel}$ of seat 102.

Still referring to FIG. 6B, the signal processing subprocess 150 uses the data from the digital accelerometer 112 and/or 118. There is no intermediate analog signal processing. The resultant signal from the digital accelerometer sensor 112 and/or 118 is processed through a base washout digital high pass filter 186. The resultant signal from base washout digital high pass filter 186 is processed through a low pass filter 188 to match with the displacement sensor 114, 116 bandwidth limited differentiator 180. The resultant signal is next processed by a leaky integrator 190 and produces an absolute velocity $V_{abs\_seat}$ of seat 102 or $V_{abs\_base}$ of base 104.

Figure 6C:
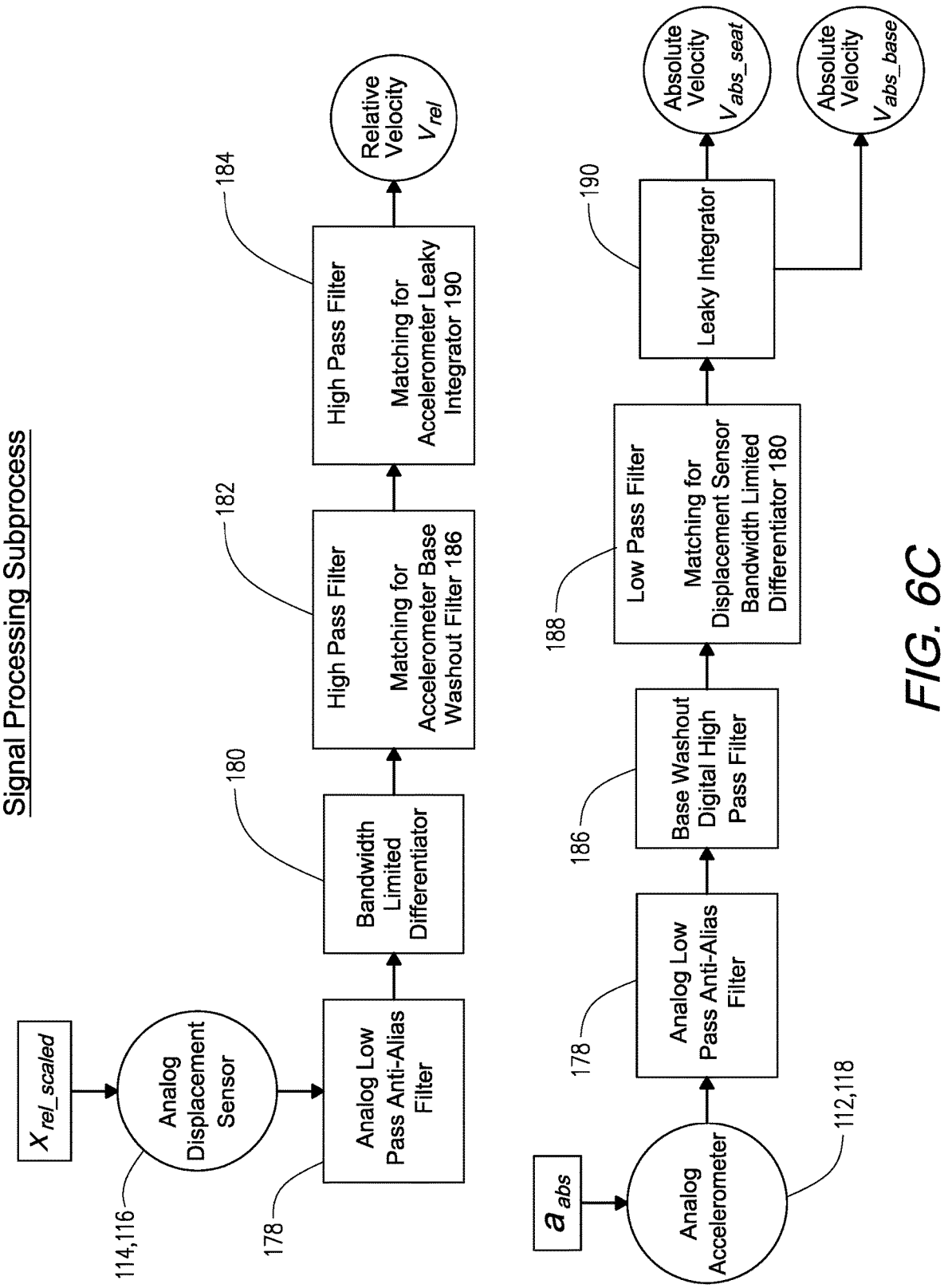

Referring to FIG. 6C, the analog displacement sensor 114 and/or 116 is illustrated as being paired with an analog accelerometer 112 and/or 118. In this configuration, the signal from the analog displacement sensor 114 and/or 116 is first processed through an analog low pass anti-aliasing filter 178. The resultant signal from the analog displacement sensor 114 and/or 116 is processed through a bandwidth limited differentiator 180. The resultant signal from bandwidth limited differentiator 180 is processed through a high pass filter 182 to match the accelerometer base washout filter 186. The output from high pass filter 182 is processed through second high pass filter 184 to match to the accelerometer leaky integrator 190. The output from second high pass filter 184 is the relative velocity $V_{rel}$ of seat 102.

Still referring to FIG. 6C, the signal processing subprocess 150 uses the data from the analog accelerometer 112 and/or 118. The signal from the analog accelerometer 112 and/or 118 includes processing the signal with an analog low pass anti-aliasing filter 178. The resultant signal from the analog accelerometer 112 and/or 118 is processed through a base washout digital high pass filter 186. The resultant signal from base washout digital high pass filter 186 is processed through a low pass filter 188 to match with the displacement sensor 114, 116 bandwidth limited differentiator 180. The resultant signal is next processed by a leaky integrator 190 and produces an absolute velocity $V_{abs\_seat}$ of seat 102 and/or $V_{abs\_base}$ of base 104.

Figure 6D:
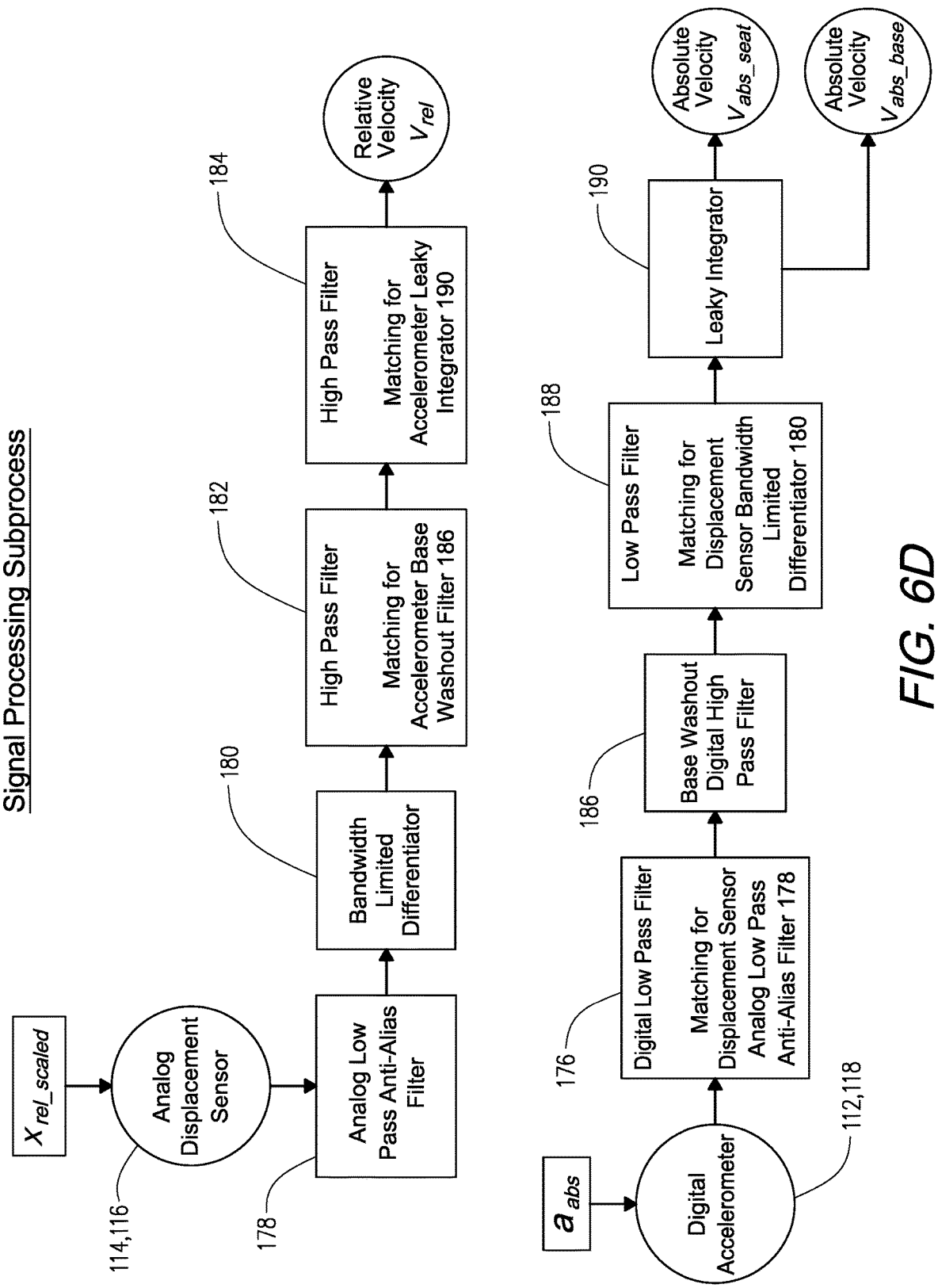

Referring to FIG. 6D, the analog displacement sensor 114 and/or 116 is illustrated as being paired with a digital accelerometer 112 and/or 118. In this configuration, the signal from the analog displacement sensor 114 and/or 116 is first processed through an analog low pass anti-aliasing filter 178. The resultant signal from the analog displacement sensor 114 and/or 116 is processed through a bandwidth limited differentiator 180. The resultant signal from bandwidth limited differentiator 180 is processed through a high pass filter 182 to match the accelerometer base washout filter 186. The output from high pass filter 182 is processed through second high pass filter 184 to match to the accelerometer leaky integrator 190. The output from second high pass filter 184 is the relative velocity $V_{rel}$ of seat 102.

Still referring to FIG. 6D, the signal processing subprocess 150 uses the data from the digital accelerometer 112 and/or 118. The signal from the digital accelerometer 112 and/or 118 is first processed through a digital low pass filter 176 to match the displacement sensor's analog low pass anti-aliasing filter 178. The resultant signal from the digital accelerometer 112 and/or 118 is processed through a base washout digital high pass filter 186. The resultant signal from base washout digital high pass filter 186 is processed through a low pass filter 188 to match to the displacement sensor 114, 116 bandwidth limited differentiator 180. The resultant signal is next processed by a leaky integrator 190 and produces an absolute velocity $V_{abs\_seat}$ of seat 102 and/or $V_{abs\_base}$ of base 104.

Referring to bandwidth limited differentiator 180 and the matching low pass filter 188, the bandwidth limitation on the limited differentiator is required to prevent that aspect of the signal processing function from having infinite gain when subjected to a step input. For bandwidth limited differentiator 180 and the matching low pass filter 188, the bandwidth limited differentiator/low pass filter frequency must be far enough above the controllable bandwidth of the seat damper so that the displacement is correctly differentiated to a velocity with minimal phase shift error within the controllable bandwidth of the damper. For example, the low pass filter frequency may be at least about ten (10) times the seat damper controllable bandwidth. Also, the low pass filter must be far enough below the controller sample rate in order to implement a meaningful filter. For example, the low pass filter may be no more than about 0.1 times the sample rate of the controller.

Referring to high pass filters, base washout filters and leaky integrators 182, 184, 186, 190 are all preferably ideal integrators from well below (e.g., about 0.1) the resonant frequency of seat 102 until well above (e.g., about ten times) the controllable bandwidth of damper 106. In this case, the ideal integrators are where the Laplace transform of $V_{out}/V_{in}$=1/second. Ideal integrators have an undesirable infinite gain under direct current (DC). The leaky integrator adds the high pass filter at a very low frequency which prevents the output of the integrator term from increasing up to one of the saturation values due to the small DC offset values. The high pass filter frequencies for base washout, matching filters, and leaky integrator must be far enough below seat 102 resonant frequency so as to provide minimal phase shift error (e.g., less than the area being controlled and within the area of sample such as about <10 degrees) within the controllable bandwidth of the filter. Preferably, this is no greater than about 0.1 times the resonant frequency of seat 102.

The leaky integrator is a combination of an ideal integrator, and a low cut-off frequency high pass filter. This high pass filter element is added to prevent the ideal integrator function from having infinite gain at zero hertz. The mathematical equations for this are known to those having skill in the art. In this invention, a non-limiting example of the high pass roll off frequency of about 0.0773 HZ is used. However, this non-limiting value is based upon a particular hardware and software combination. For a different hardware and software combination, the non-limiting value will also be different. The limitations are the resolution and the sample rate of the digital fixed-point processor, which may change for each configuration.

Absolute and Relative Ellipse Endstop Control Subprocesses

The Ellipse Endstop Control subprocesses 152, 154 is illustrated in FIGS. 7A-7E. The Absolute Ellipse Endstop Control subprocess 152 is almost identical to the Relative Ellipse Endstop Control subprocess 154, except that the input data is slightly different between the two. The Absolute Ellipse Endstop Control subprocess 152 uses the maximum scaled displacement $x_{max\_scaled}$, the minimum scaled displacement $x_{min\_scaled}$, the scaled relative displacement $x_{rel\_scaled}$, the absolute velocity $V_{abs\_seat}$ of seat 102, and the relative velocity $V_{rel}$. The Relative Ellipse Endstop Control subprocess 154 uses the maximum scaled displacement $x_{max\_scaled}$, the minimum scaled displacement $x_{min\_scaled}$, the scaled relative displacement $x_{rel\_scaled}$, and the relative velocity $V_{rel}$.

Figure 7A:
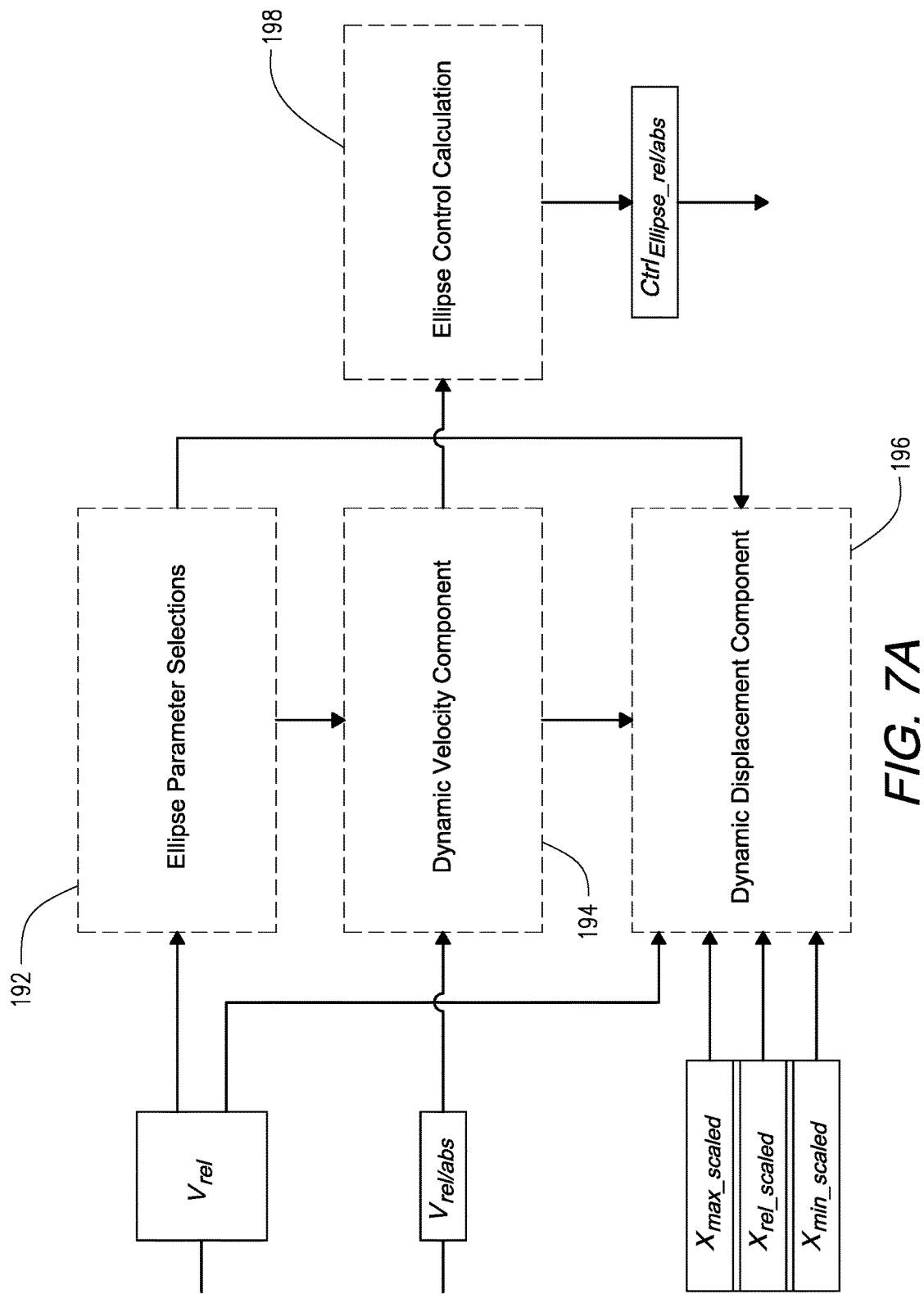
FIGS. 7A-7D are flowcharts of an ellipse endstop control subprocess.
Figure 7B:
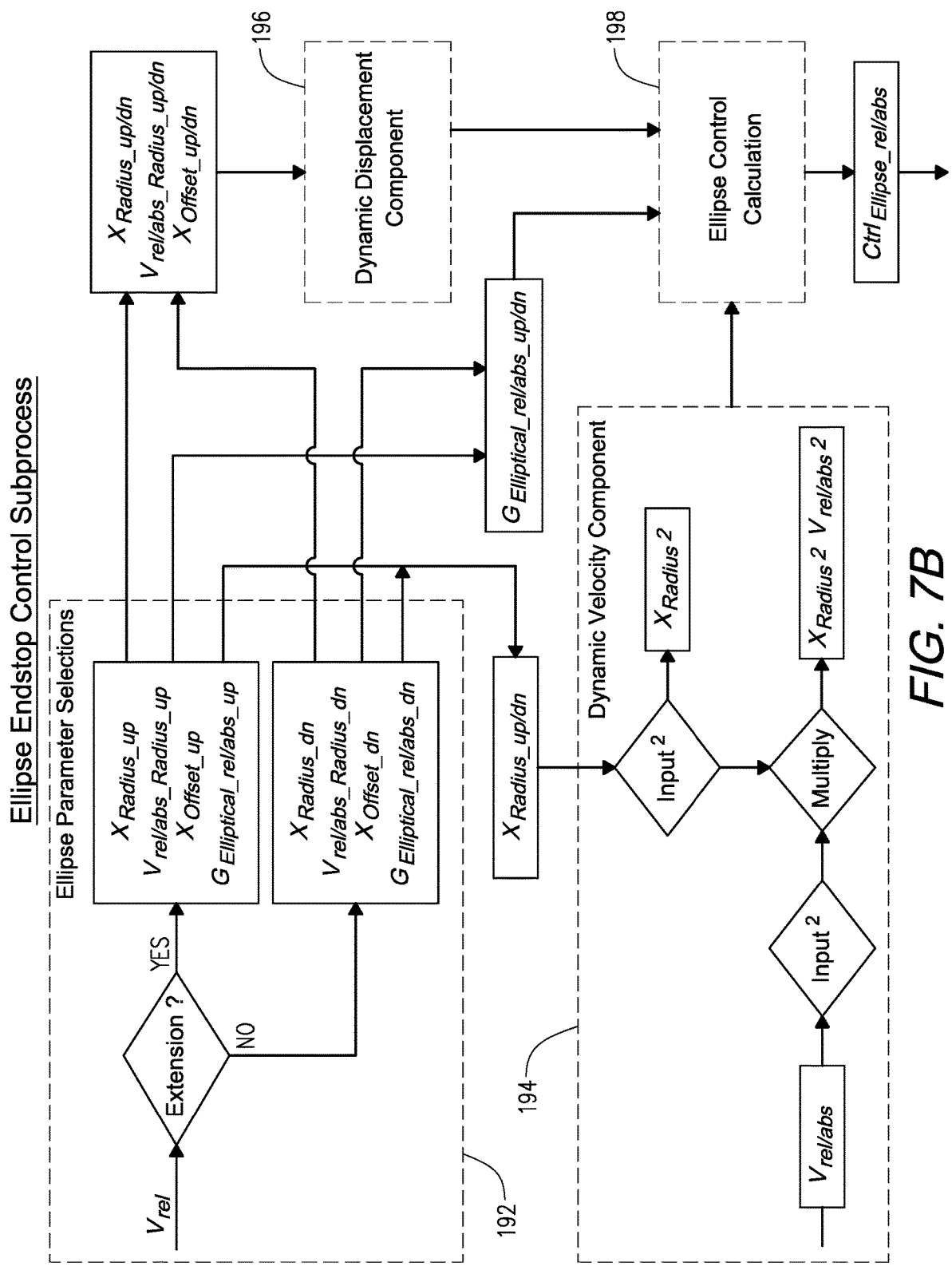

Referring to FIG. 7A, within the Ellipse Endstop Control subprocesses 152, 154 there are four subprocesses: the ellipse parameter selections subprocess 192, the dynamic velocity component 194, the dynamic displacement component 196, and the ellipse control calculation 198. The output is an ellipse control signal $Ctrl_{Ellipse\_rel/abs}$. Referring to FIG. 7B, the ellipse parameter selection subprocess 192 first receives the relative velocity $V_{rel}$ input. If the seat is extending, then the subprocess communicates the stored parameters of displacement radius up $x_{Radius\_up}$, the relative or absolute velocity radius up $V_{rel/abs\_Radius\_up}$, the offset displacement up $x_{Offset\_up}$, and the gain elliptical up $G_{Elliptical\_rel/abs\_up}$ to the dynamic velocity component subprocess 194, the dynamic displacement component subprocess 196, and the ellipse control subprocess 198. If the seat is not extending, then the subprocess communicates the stored parameters of displacement radius down $x_{Radius\_dn}$, the relative or absolute velocity radius down $V_{rel/abs\_Radius\_dn}$, the offset displacement down $x_{Offset\_dn}$, and the gain elliptical down $G_{Elliptical\_rel/abs\_dn}$ to the dynamic velocity component subprocess 194, the dynamic displacement component subprocess 196, and the ellipse control subprocess 198. Depending upon the solution for either relative or absolute velocity $V_{rel/abs}$, the gains may be different for gain elliptical up or down $G_{Elliptical\_rel/abs\_up/dn}$ between Absolute Ellipse Endstop Control subprocess 152 and Relative Ellipse Endstop Control subprocess 154.

Figure 7C:
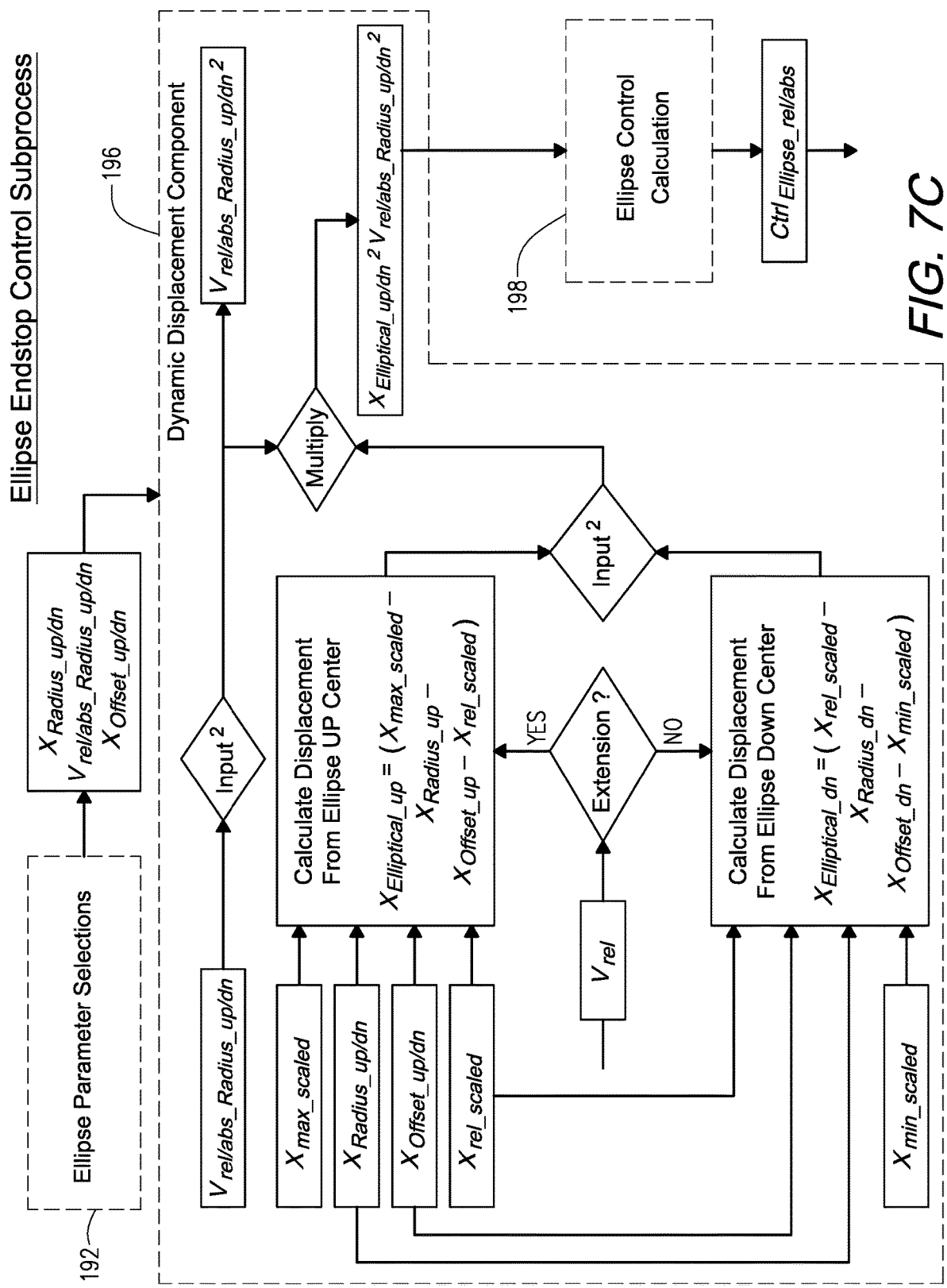
Figure 7D:
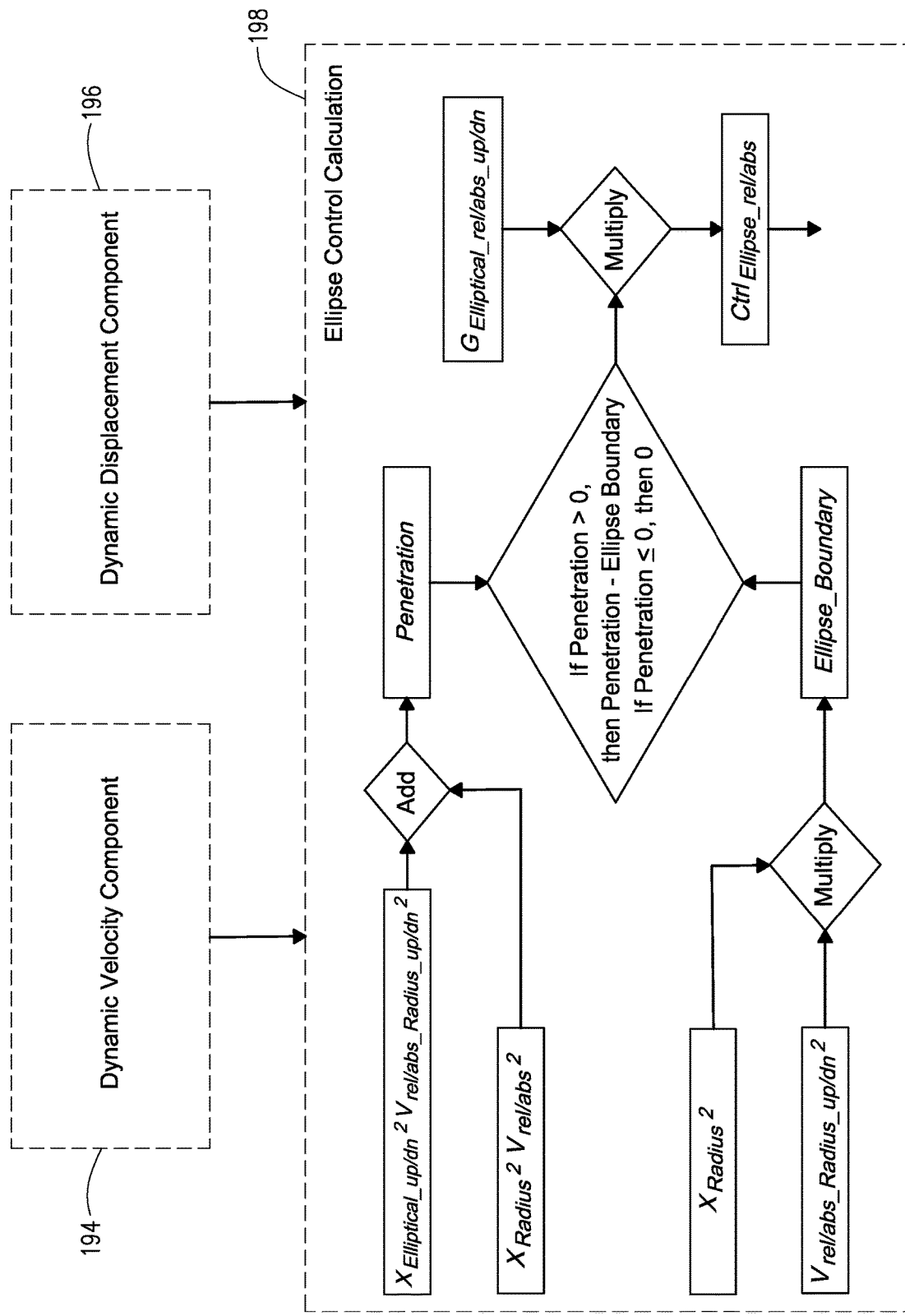
Figure 7E:
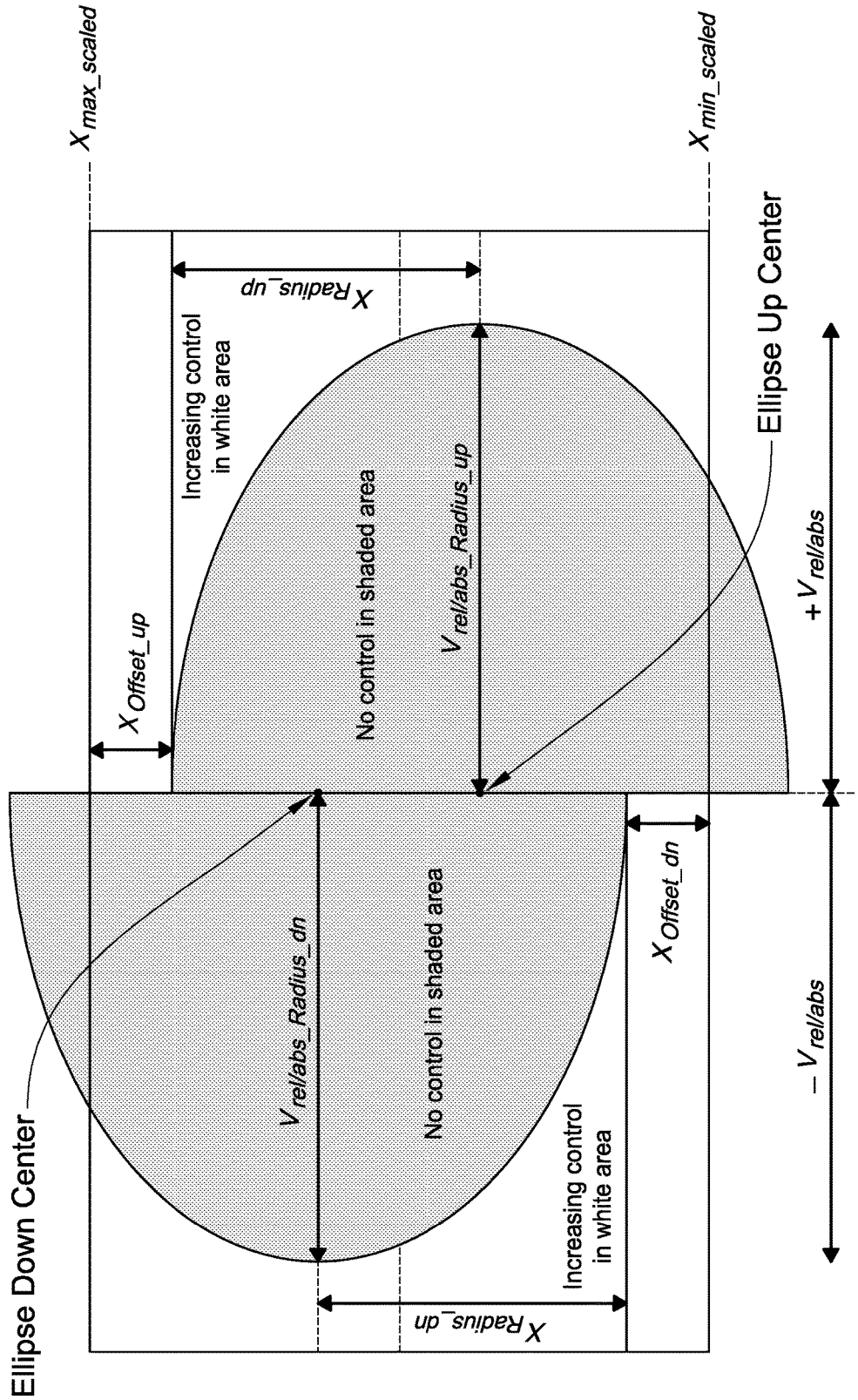
FIG. 7E is a schematic of the ellipse endstop control subprocess elements.

The displacement radius up $x_{Radius\_up}$ and displacement radius down $x_{Radius\_dn}$ are illustrated in FIG. 7E. Similarly, the relative or absolute velocity radius up $V_{rel/abs\_Radius\_up}$ and the relative or absolute velocity radius down $V_{rel/abs\_Radius\_dn}$, and both the offset up displacement $x_{Offset\_up}$ and the offset displacement down $x_{Offset\_dn}$ are illustrated in FIG. 7E. The parametric values for the ellipse control are determined by measuring the scaled displacement travel of the seat under inputs that do not induce endstop collisions. The displacement radius up or down $x_{Radius\_up/dn}$ values are half of the total travel between a maximum stroke not hitting the endstops in the direction of travel indicated (extension=up, compression=dn). The $V_{rel/abs\_Radius}$ values are the maximum velocities observed at midstroke that can be mitigated without an endstop collision (by springs, passive damping, and skyhook control). The displacement offset up or down $x_{Offset\_up/dn}$ parameter is used for measured asymmetry in the displacement travel in a given direction (e.g., a large amount of extension relative to midstroke may be more tolerable than compression in the compressing direction). This effectively can be used to create a fixed amount of control based entirely on displacement at the endstop location. The gain elliptical up or down $G_{Elliptical\_rel/abs\_up/dn}$ is determined by each seat manufacturer during the tuning process of the seat 102 having damper 106 attached thereto. These quantities are the proportional constants between seat 102 excursion beyond the established displacement radius up or down $x_{Radius\_up/dn}$ and relative or absolute velocity radius up or down $V_{rel/abs\_Radius\_up/dn}$ and the output of damper 106. The gains are tuned to prevent endstop collisions (by increasing the value) while balancing the acceleration due to overcontrol (by reducing the value). Both endstop collisions and overcontrol may lead to increased acceleration and harshness in the seat vibration.

The dynamic velocity component subprocess 194 uses the radius displacement up or down $x_{Radius\_up/dn}$ value and the relative or absolute velocity $V_{rel/abs}$ value. The displacement radius up or down $x_{Radius\_up/dn}$ value is pulled from NVRAM. The relative or absolute velocity $V_{rel/abs}$ value is squared and then multiplied by the squared displacement radius $x_{Radius}^2$ value. The result is the squared displacement radius squared relative or absolute velocity $x_{Radius}^2 V_{rel/abs}^2$ value. The displacement radius up or down $x_{Radius\_up/dn}$ value is determined by selecting the appropriate OEM entered displacement radius up $x_{Radius\_Up}$ or displacement radius down $x_{Radius\_Dn}$ based on the direction of travel of the seat: extending [$V_{rel}$>0] or compressing [$V_{rel}$<0], respectively. Both the squared displacement radius $x_{Radius}^2$ value and the squared relative or absolute velocity squared displacement radius $x_{Radius}^2 V_{rel/abs}^2$ value are communicated to the ellipse control calculation subprocess 198.

The dynamic velocity component 194 is mathematically represented by the following equation:

$$x_{Radius}^2 V_{rel/abs}^2 = x_{Radius}^2 * V_{rel/abs}^2 \quad \text{Eq. 15}$$

Referring to FIG. 7C, the dynamic displacement component subprocess 196 calculates the squared elliptical displacement squared relative velocity radius $x_{Elliptical\_up/dn}^2 V_{rel/abs\_Radius\_up/dn}^2$, where $x_{Elliptical\_up/dn}^2$ is the squared ellipse up or down center displacement and $V_{rel/abs\_Radius\_up/dn}^2$ is the squared relative or absolute velocity radius up or down. One step in this subprocess is to square relative or absolute velocity radius $V_{rel/abs\_Radius\_up/dn}$ and output the value as the squared relative or absolute velocity radius $V_{rel/abs\_Radius\_up/dn}^2$. Another step in this subprocess is to calculate the displacement from the ellipse center for the extending or compressing of seat 102. The relative velocity $V_{rel}$ is used to define whether seat 102 is extending or compressing. If seat 102 is extending, the upward displacement from the ellipse up center $x_{Elliptical\_up}$ uses the maximum scaled displacement $x_{max\_scaled}$, the displacement radius up $x_{Radius\_up}$, the offset up displacement $x_{Offset\_up}$, and the scaled relative displacement $x_{rel\_scaled}$. If seat 102 is compressing, the downward displacement from the ellipse down center $x_{Elliptical\_dn}$ uses the minimum scaled displacement $x_{min\_scaled}$, the displacement radius down $x_{Radius\_dn}$, the offset displacement down $x_{Offset\_dn}$, and the scaled relative displacement $x_{rel\_scaled}$.

To calculate the displacement from the ellipse up center $x_{Elliptical\_up}$ for the extending seat 102, the displacement radius up $x_{Radius\_up}$, the offset displacement up $x_{Offset\_up}$, and the scaled relative displacement $x_{rel\_scaled}$, are all subtracted from the maximum scaled displacement $x_{max\_scaled}$. To calculate the displacement from the ellipse down center $x_{Elliptical\_dn}$ for the compressing seat 102, the displacement radius down $x_{Radius\_dn}$, the offset displacement down $x_{Offset\_dn}$, and the minimum scaled displacement $x_{min\_scaled}$ are all subtracted from the scaled relative displacement $x_{rel\_scaled}$. Depending on whether seat 102 is extending or compressing, the ellipse up center $x_{Elliptical\_up}$ displacement or the ellipse down center $x_{Elliptical\_dn}$ displacement is squared.

The squared relative or absolute velocity radius $V_{rel/abs\_Radius\_up/dn}^2$ is multiplied by either the squared ellipse up center $x_{Elliptical\_up}^2$ displacement or the squared ellipse down center $x_{Elliptical\_dn}^2$ displacement. The output is the squared elliptical displacement squared relative or absolute velocity radius $x_{Elliptical\_up/dn}^2 V_{rel/abs\_Radius\_up/dn}^2$, which is stored and communicated to the ellipse control calculation subprocess 198.

These dynamic control components are mathematically represented by the following equations:

$$x_{Elliptical\_up}^2 = (x_{max\_scaled} - x_{Radius\_up} - x_{Offset\_up} - x_{rel\_scaled})^2 \quad \text{Eq. 16}$$

$$x_{Elliptical\_dn}^2 = (x_{rel\_scaled} - x_{Radius\_dn} - x_{Offset\_dn} - x_{min\_scaled})^2 \quad \text{Eq. 17}$$

$$x_{Elliptical\_up/dn}^2 V_{rel/abs\_Radius\_up/dn}^2 = V_{rel/abs\_Radius\_up/dn}^2 * x_{Elliptical\_up/dn}^2 \quad \text{Eq. 18}$$

Referring to FIG. 7D, the relative or absolute ellipse control signal $Ctrl_{Ellipse\_rel/abs}$ is calculated. One step involves adding squared radius displacement squared relative or absolute velocity $x_{Radius}^2 V_{rel/abs}^2$ with the squared elliptical displacement squared relative or absolute velocity radius $x_{Elliptical\_up/dn}^2 V_{rel/abs\_Radius\_up/dn}^2$ to determine a penetration component. In another step, the squared relative or absolute velocity radius $V_{rel/abs\_Radius\_up/dn}^2$ is multiplied by the squared displacement radius $x_{Radius}^2$ to determine an ellipse boundary. The ellipse boundary is subtracted from the penetration component. If the value of the difference between the penetration component and the ellipse boundary is greater than zero, then the value is multiplied by an elliptical up or down gain $G_{Elliptical\_rel/abs\_up/dn}$ value. The resulting value is the ellipse control signal $Ctrl_{Ellipse\_rel/abs}$. If the value of the difference between the penetration component and the ellipse boundary is less than or equal to zero, then the value of the ellipse control signal $Ctrl_{Ellipse\_rel/abs}$ is zero. The elliptical up or down gain $G_{Elliptical\_rel/abs\_up/dn}$ value is one that is established by the seat manufacturer for their particular seat during the tuning process for the seat. The tuning process is discussed below.

These ellipse control calculations 198 are mathematically represented by the following equations:

$$\text{Penetration} = x_{Elliptical\_up/dn}^2 V_{rel/abs\_Radius\_up/dn}^2 x_{Radius}^2 V_{rel/abs}^2 \quad \text{Eq. 19}$$

$$\text{Ellipse Boundary} = V_{rel/abs\_Radius\_up/dn}^2 * x_{Radius}^2 \quad \text{Eq. 20}$$

$$Ctrl_{Ellipse\_rel/abs} = G_{Elliptical\_rel/abs\_up/dn} * (\text{Penetration} - \text{Ellipse Boundary}) \text{ when Penetration} > 0, \text{ and} \quad \text{Eq. 21}$$

$$Ctrl_{Ellipse\_rel/abs} = 0 \text{ when Penetration} \leq 0 \quad \text{Eq. 22}$$

ESO2 Endstop Control Subprocess

Figure 8A:
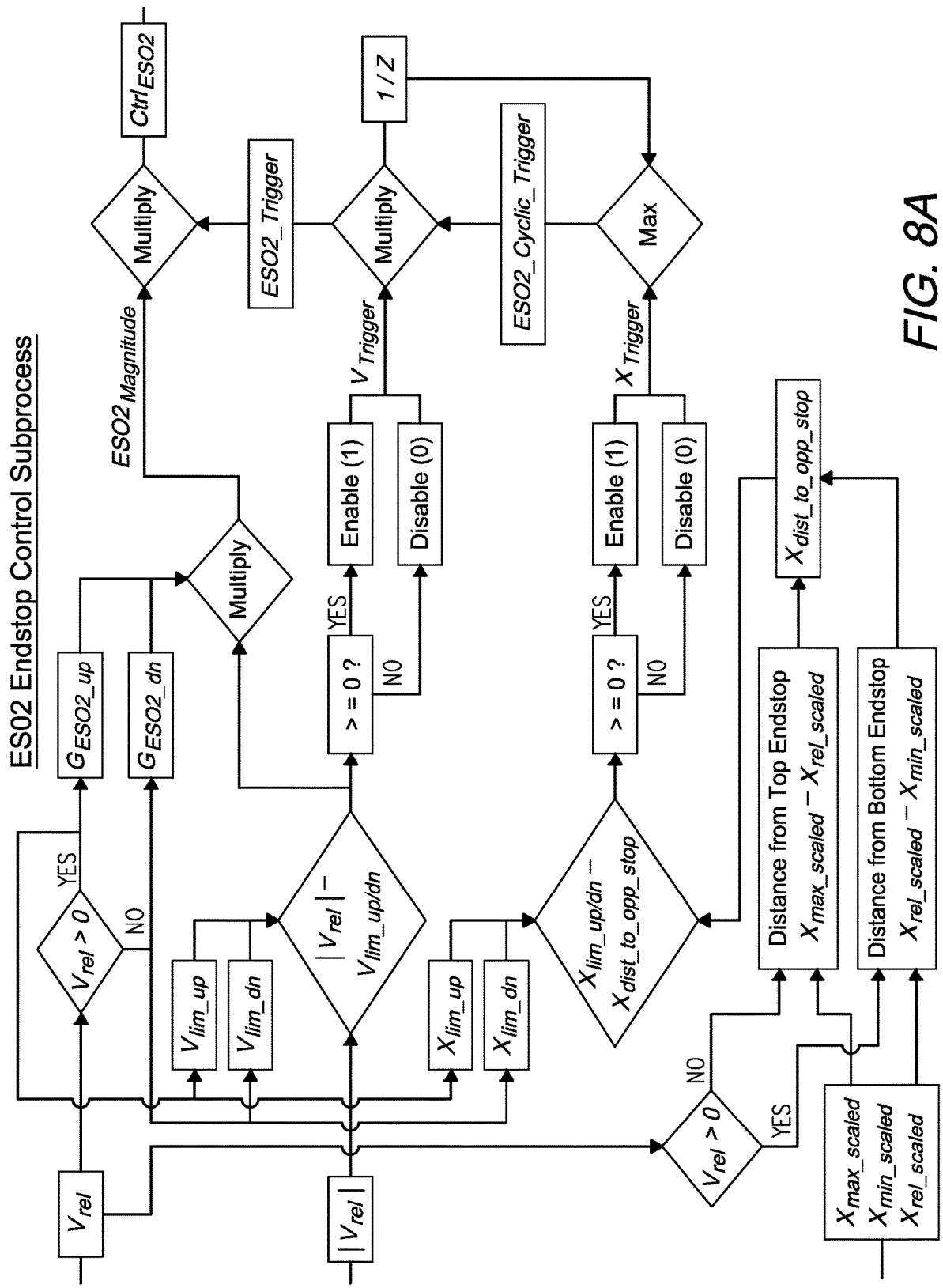
FIG. 8A is a flowchart of an ESO2 endstop control subprocess.
Figure 8B:
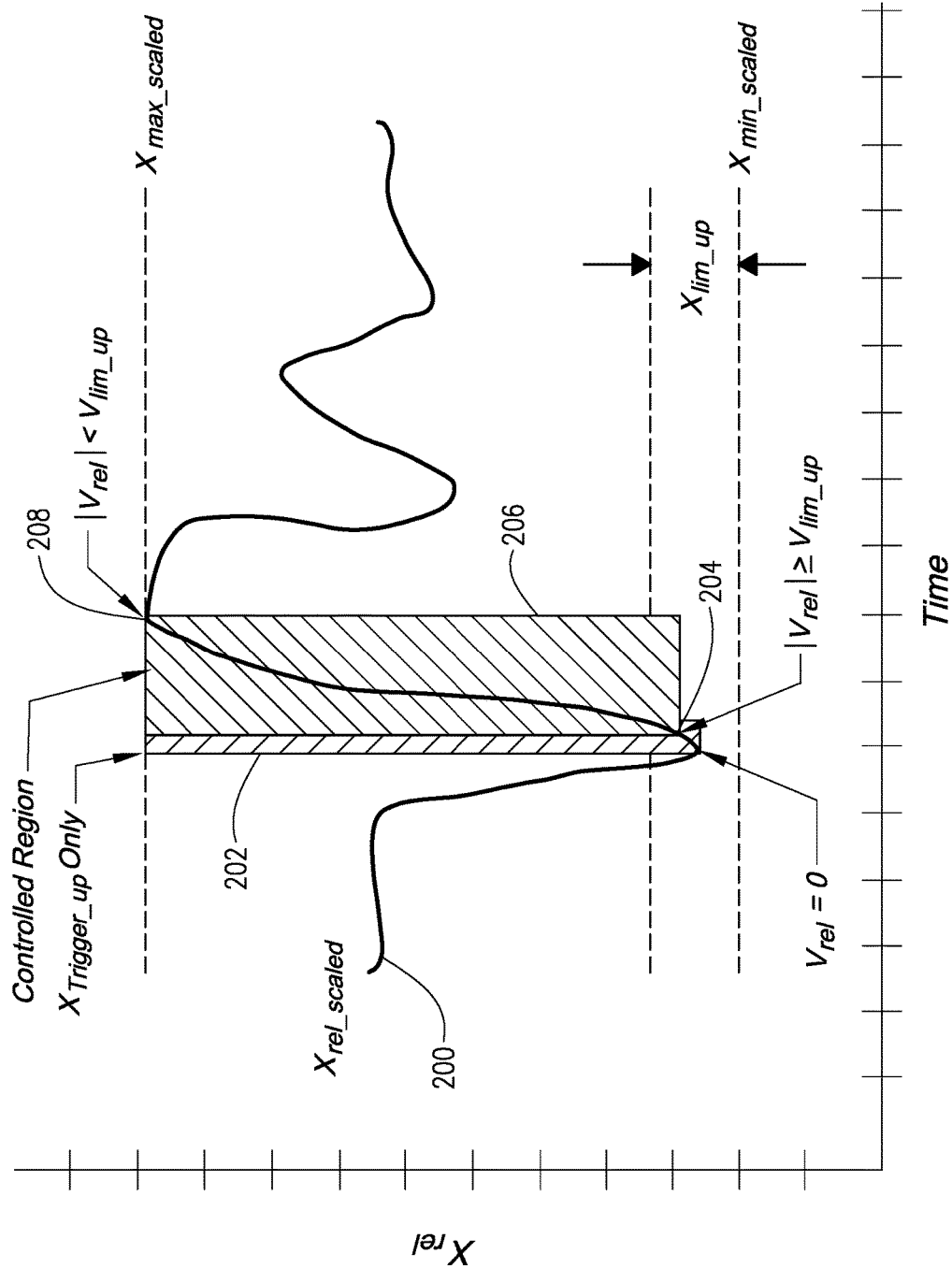
FIG. 8B is a schematic of the ESO2 endstop control subprocess elements.

Referring to FIGS. 8A and 8B, the ESO2 Endstop Control subprocess 156 is illustrated. In this subprocess the relative velocity $V_{rel}$, the maximum scaled displacement $x_{max\_scaled}$, the minimum scaled displacement $x_{min\_scaled}$, and the scaled relative displacement $x_{rel\_scaled}$ are inputs. The relative velocity limit up $V_{lim\_up}$, the relative velocity limit down $V_{lim\_dn}$, the displacement limit up $x_{lim\_up}$, and the displacement limit down $x_{lim\_dn}$ are OEM entered parameters correlated to measurements. Referring to FIG. 8A, the initial start of the subprocess is to determine if the seat is extending or compressing by determining if the relative velocity $V_{rel}$ is greater or less than zero. The absolute value of the relative velocity $|V_{rel}|$ is also determined at this point by taking the absolute value of the relative velocity $V_{rel}$.

If the relative velocity $V_{rel}$ is greater than zero, then the subprocess uses the "up" set of parameters and gains denoting seat 102 is extending. The "up" set of parameters and gains are the relative velocity limit up $V_{lim\_up}$, the relative displacement limit up $x_{lim\_up}$, and an OEM provided gain value up $G_{ESO2\_up}$. The relative displacement limit up $x_{lim\_up}$ is a quantity in the scaled relative displacement $x_{rel\_scaled}$ frame of reference. The relative displacement limit up $x_{lim\_up}$ is the displacement threshold that needs to be exceeded in damper 106 compression to trigger the ESO2 control decision process. As depicted in FIG. 8B, it is measured as a proximity to the compression end of travel which is the minimum scaled displacement $x_{min\_scaled}$. If seat 102 compresses to below this value, it indicates an imminent extension endstop collision due to the stored potential energy of spring 108 and lower snubber 138. The displacement trigger $x_{Trigger}$ is set to true if the displacement distance to the opposite stop $x_{dist\_to\_opp\_stop}$ is less than or equal to the relative displacement limit up $x_{lim\_up}$.

The relative velocity limit up $V_{lim\_up}$ parameter is a quantity in the relative velocity $V_{rel}$ frame of reference that denotes the extending velocity is of sufficient magnitude to indicate the need for extra control to prevent collisions with the endstop. The velocity trigger $V_{Trigger}$ is set to true if the absolute value of the relative velocity $|V_{rel}|$ exceeds relative velocity limit up $V_{lim\_up}$.

If the velocity trigger $V_{Trigger}$ and the displacement trigger $x_{Trigger}$ are true at the same time, the ESO2 control will remain active until the absolute value of the relative velocity $|V_{rel}|$ returns below the relative velocity limit up $V_{lim\_up}$ value, which indicates seat 102 has been slowed to a controlled level.

The OEM provided gain value up $G_{ESO2\_up}$ is the scalar relationship between the absolute value of the relative velocity $|V_{rel}|$ magnitude and the control output of damper 106, which is sufficient to prevent the extension endstop collision while using the full stroke of damper 106. This effectively balances the harshness of endstop collisions and potential overcontrol of damper 106. The OEM provided gain value up $G_{ESO2\_up}$ is then multiplied by the absolute value of the relative velocity $|V_{rel}|$ magnitude over the velocity limit up $V_{lim\_up}$ to provide a $ESO2_{Magnitude}$ term. This provides enough control in an effort to prevent the extension endstop collision while using the full stroke of damper 106.

Similarly, if the determination is that seat 102 is compressing, then the subprocess uses "down (dn)" set of parameters and gains denoting seat 102 is compressing. The "dn" set of parameters and gains are the relative velocity limit down $V_{lim\_dn}$, the relative displacement limit down $x_{lim\_dn}$, and an OEM provided gain value down $G_{ESO2\_dn}$. The displacement limit down $x_{lim\_dn}$ is a quantity in the scaled relative displacement $x_{rel\_scaled}$ frame of reference. The displacement limit down $x_{lim\_dn}$ is a displacement threshold that needs to be exceeded in damper 106 extension to trigger the ESO2 control decision process. It is measured as the proximity to the extension end of travel maximum scaled displacement $x_{max\_scaled}$. If seat 102 extends to above this value, it indicates an imminent compression endstop collision due to the stored potential energy of spring 108 and upper snubber 136. In this case, the displacement trigger $x_{Trigger}$ is set to true if the displacement distance to the opposite stop $x_{dist\_to\_opp\_stop}$ is less than or equal to the relative displacement limit down $x_{lim\_dn}$.

The relative velocity limit down $V_{lim\_dn}$ parameter is a quantity in the relative velocity $V_{rel}$ frame of reference that denotes the compressing velocity is of sufficient magnitude to indicate the need for extra control to prevent collisions with the endstop. The velocity trigger $V_{Trigger}$ is set to true if the absolute value of the relative velocity $|V_{rel}|$ exceeds relative velocity limit down $V_{lim\_dn}$.

As before, if the velocity trigger $V_{Trigger}$ and the displacement trigger $x_{Trigger}$ are true at the same time, the ESO2 control will remain active until absolute value of the relative velocity $|V_{rel}|$ returns below the relative velocity limit down $V_{lim\_dn}$ value, which indicates seat 102 has been slowed to a controlled level.

The OEM provided gain value down $G_{ESO2\_dn}$ is the scalar relationship between the absolute value of the relative velocity $|V_{rel}|$ magnitude and the control output of damper 106, which is sufficient to prevent the compression endstop collision while using the full stroke of damper 106. This also effectively balances the harshness of endstop collisions and potential overcontrol of damper 106. The OEM provided gain value down $G_{ESO2\_dn}$ is then multiplied by the absolute value of the relative velocity $|V_{rel}|$ magnitude over the velocity limit down $V_{lim\_dn}$ to provide a $ESO2_{Magnitude}$ term. This provides enough control in an effort to prevent the extension endstop collision while using the full stroke of damper 106.

Determining the velocity trigger calculation starts with determining if seat 102 is extending or compressing. Depending upon the state of seat 102, the relative velocity limit up $V_{lim\_up}$ is subtracted from the absolute value of the relative velocity $|V_{rel}|$, or the relative velocity limit down $V_{lim\_dn}$ is subtracted from the absolute value of the relative velocity $|V_{rel}|$. The resultant value is multiplied by either the OEM provided gain value up $G_{ESO2\_up}$, or the OEM provided gain value down $G_{ESO2\_dn}$ to determine the ESO2 endstop magnitude $ESO2_{Magnitude}$. This is represented by the following equation:

$$ESO2_{Magnitude} = |V_{rel}| - V_{lim\_up/dn} * G_{ESO2\_up/dn} \qquad \text{Eq. 23}$$

When the resultant value of relative velocity limit up or down $V_{lim\_up/dn}$ is subtracted from the absolute value of the relative velocity $|V_{rel}|$, and if the result is greater than or equal to zero, then the velocity trigger $V_{Trigger}$ is set to equal 1. If the resultant value is less than zero, then the velocity trigger $V_{Trigger}$ is set to equal zero. The velocity trigger $V_{Trigger}$ is represented by the following equations:

$$V_{Trigger} = 1 \text{ when } |V_{rel}| - V_{lim\_up/dn} \geq 0 \qquad \text{Eq. 24}$$

$$V_{Trigger} = 0 \text{ when } |V_{rel}| - V_{lim\_up/dn} < 0 \qquad \text{Eq. 25}$$

Determining the displacement trigger calculation starts with determining if seat 102 is extending or compressing. Depending upon the state of seat 102, the displacement distance to the opposite stop $x_{dist\_to\_opp\_stop}$ is subtracted from the relative displacement limit up $x_{lim\_up}$, or, the opposite stop $x_{dist\_to\_opp\_stop}$ is subtracted from the relative displacement limit down $x_{lim\_dn}$. If that resultant value is greater than or equal to zero, then the displacement trigger $x_{Trigger}$ is set to equal 1, and if the resultant value is less than zero the displacement trigger $x_{Trigger}$ is set to equal zero. The displacement trigger $x_{Trigger}$ is represented by the following equations:

$$x_{Trigger} = 1 \text{ when } x_{lim\_up/dn} - x_{dist\_to\_opp\_stop} \geq 0 \qquad \text{Eq. 26}$$

$$x_{Trigger} = 0 \text{ when } x_{lim\_up/dn} - x_{dist\_to\_opp\_stop} < 0 \qquad \text{Eq. 27}$$

To determine the displacement distance to the opposite stop $x_{dist\_to\_opp\_stop}$ begins with knowing if seat 102 is extending or compressing. If compressing, the distance from the top endstop is determined by subtracting the scaled relative displacement $x_{rel\_scaled}$ from the maximum scaled displacement $x_{max\_scaled}$. If extending, the distance from the compression endstop is determined by subtracting the minimum scaled displacement $x_{min\_scaled}$ from the scaled relative displacement $x_{rel\_scaled}$. The result is displacement distance to the opposite stop $x_{dist\_to\_opp\_stop}$. This is represented by the following equations:

$$\text{If } V_{rel} \leq 0, \text{ then } x_{dist\_to\_opp\_stop} = x_{max\_scaled} - x_{rel\_scaled} \qquad \text{Eq. 28}$$

$$\text{If } V_{rel} > 0, \text{ then } x_{dist\_to\_opp\_stop} = x_{max\_scaled} - x_{rel\_scaled} \qquad \text{Eq. 29}$$

The next step is to determine ESO2 cyclic trigger ESO2_Cyclic_Trigger by determining the maximum value between the displacement trigger $x_{Trigger}$ and the ESO2 Trigger from the last system controller processor (not shown) clock cycle. ESO2_Trigger is the decision enabler for ESO2 control that decides ESO2 control signal output. This Boolean output is calculated out of the velocity and displacement trigger decision processes. The ESO2 cyclic trigger ESO2_Cyclic Trigger is multiplied by velocity trigger $V_{Trigger}$ to determine the ESO2 Trigger ESO2_Trigger. The ESO2 Trigger ESO2_Trigger value is multiplied by the ESO2 endstop magnitude $ESO2_{Magnitude}$ value to determine the ESO2 control signal $Ctrl_{ESO2}$.

Referring to FIG. 8B, the ESO2 Endstop Control subprocess 156 is further illustrated. FIG. 8B illustrates the measured relative displacement $x_{rel}$ of seat 102 over time during an impulse event that causes collision stops (e.g., a pothole or speedbump). What is evident in FIG. 8B is the condition of the extending (or "up") logic of the subprocess. The scaled relative displacement trace 200 shows seat 102 initially compressing to near the end of travel in the compression direction. During this initial event, the ESO2 Control subprocess 156 is inactive, which means that control would be covered by either of the Ellipse Endstop Control subprocesses 152, 154 and/or the Skyhook Control subprocess 160.

Scaled relative displacement trace 200 is illustrated approaching the relative displacement limit up $x_{lim\_up}$ up proximity to the minimum scaled displacement $x_{min\_scaled}$, which is the parametric combination measured to indicate a compressive event with sufficient stored energy to potentially cause a subsequent extension endstop collision. Once the relative velocity $V_{rel}$ is greater than zero, indicating the seat is extending, the "up" parameters are selected and the displacement trigger $x_{Trigger}$ is activated.

At extreme compression, the relative velocity $V_{rel}$ switches from negative (compressing) to positive (extending) at the point $V_{rel}$=0. This activates the "up" parameters of the algorithm and sets the displacement trigger $x_{Trigger}$ to "true" (as indicated by box 202). As time progresses, the relative velocity $V_{rel}$ (the measured value is not shown) continues to increase until it exceeds the relative velocity limit up $V_{lim\_up}$ parameter. This indicates that the stored energy is not sufficiently controlled to prevent the extension endstop collision, meaning the potential and kinetic stored energy have shown early indicators of an imminent extension collision. This sets the velocity trigger $V_{Trigger}$ logic to true.

Since both the displacement trigger $x_{Trigger}$ and velocity trigger $V_{Trigger}$ are true, the ESO2 Endstop Control subprocess 156 is active and the output of the control is proportional to the velocity by the quantity $G_{ESO2\_up}$, which is tuned to provide enough control to prevent endstop collision while utilizing as much of the suspension stroke as possible. This is marked by the beginning point 204 of the region 206. Once the ESO2 control is active, the displacement trigger $x_{Trigger}$ is no longer needed, and the control remains active until the relative velocity $V_{rel}$ slows to below the relative velocity limit up $V_{lim\_up}$ up value, which denotes that the seat is back under control and ESO2 Endstop Control subprocess 156 is no longer needed (this is marked on the plot at the ending point 208 of the region 206). The above illustrates a one half-cycle of ESO2 Endstop Control subprocess 15. The ESO2 Endstop Control subprocess 156 would potentially be active again during the subsequent compression cycle, but this is not detailed in FIG. 8B.

Maximum Endstop Control Subprocess

In the Maximum Endstop Control subprocess 158, the values of the absolute ellipse control signal $Ctrl_{Ellipse\_abs}$, the relative ellipse control signal $Ctrl_{Ellipse\_rel}$, and the ESO2 control signal $Ctrl_{ESO2}$ are compared to each other. The maximum value is selected as the endstop control signal $u_{ES}$.

Skyhook Control Subprocess

Figure 9:
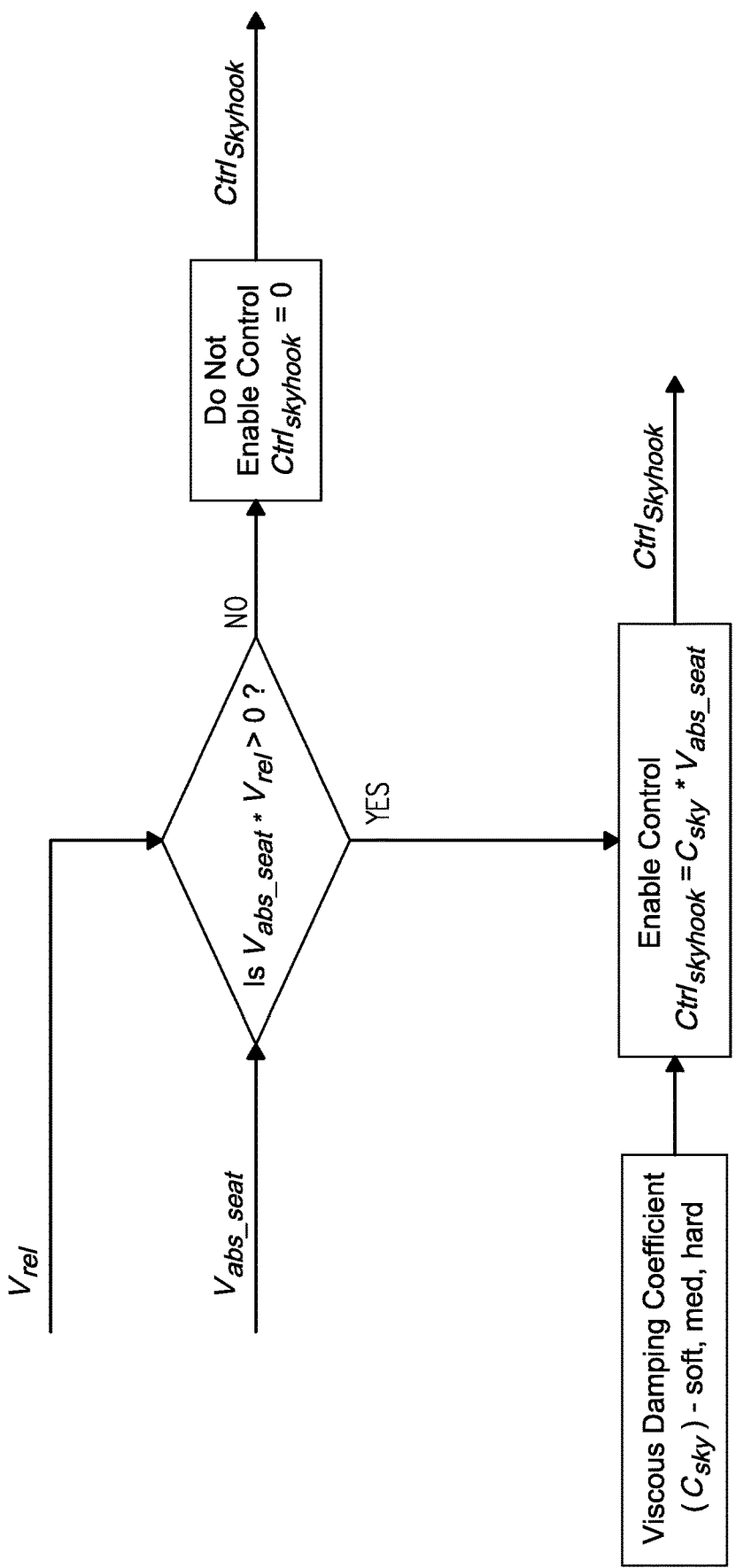
FIG. 9 is a flowchart of a skyhook control subprocess.

Referring to FIG. 9, the Skyhook Control subprocess 160 is illustrated. This subprocess begins with determining whether the product of absolute velocity $V_{abs\_seat}$ of seat 102 times the relative velocity $V_{rel}$ is greater than zero. If the answer is no, then the Skyhook Control subprocess 160 outputs a skyhook control signal $Ctrl_{skyhook}$ with a value of zero. If the answer is yes, then the Skyhook Control subprocess 160 outputs a skyhook control signal $Ctrl_{skyhook}$ that is equal to the viscous damping coefficient $C_{sky}$ times the absolute velocity $V_{abs\_seat}$ of seat 102. The viscous damping coefficient $C_{sky}$ is a firmness selection made by an occupant of the seat and may range between soft to firm. For example, there may be a three-position selection for soft, medium, or firm, or there may be a scalable section between soft and firm. The skyhook control signal $Ctrl_{skyhook}$ is stored in memory such as random-access memory (RAM). The equations for the Skyhook Control subprocess 160 are:

$V_{abs\_seat} * V_{rel} > 0$ then enable control,
$Ctrl_{Skyhook} = C_{sky} * V_{abs\_seat}$      Eq. 30

$V_{abs\_seat} * V_{rel} \leq 0$ then do not enable control,
$Ctrl_{Skyhook} = 0$      Eq. 31

Figure 10:
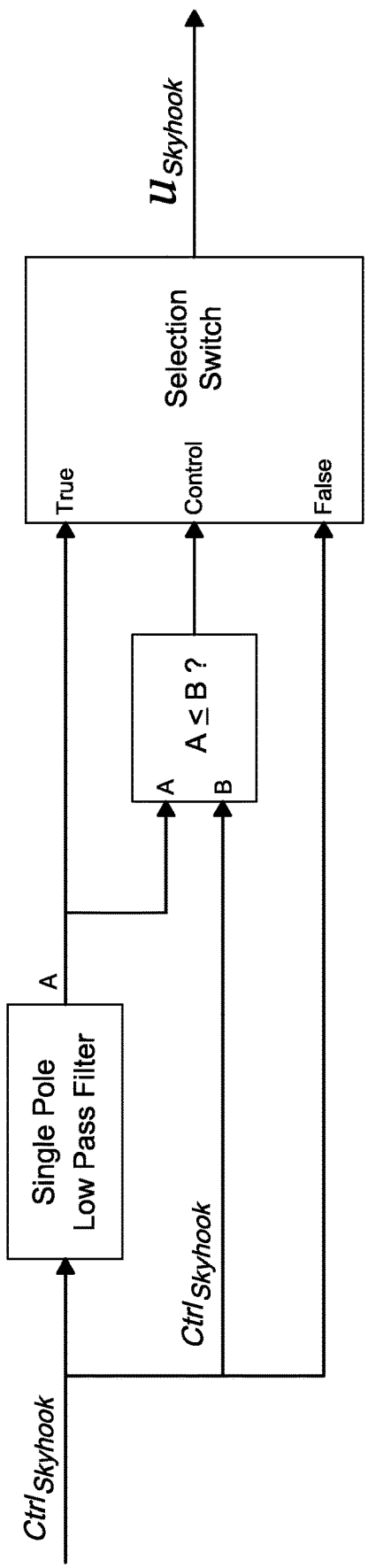
FIG. 10 is a flowchart of a rising edge filter subprocess.

Referring to FIG. 10, the Rising Edge Filter subprocess 162 is illustrated using the skyhook control signal $Ctrl_{skyhook}$ from the Skyhook Control subprocess 160. The skyhook control signal $Ctrl_{skyhook}$ is processed through a single pole low pass filter. If response A is less than or equal to the response B, then value of the skyhook control signal $Ctrl_{skyhook}$ is the control output from the low pass filter, otherwise the unmodified control value is outputted to the skyhook control signal $u_{skyhook}$. The skyhook control signal $u_{skyhook}$ is stored in memory such as RAM.

Control Aggregation Subprocess

Referring to FIG. 4, the Control Aggregation subprocess 164 uses the endstop control signal $u_{ES}$ and the skyhook control signal $u_{skyhook}$. The aggregation of these signals may be combined by either taking the maximum or the sum of the two control outputs. The choice is a PDIF parameter selection provided by the OEM. Taking the maximum value between the endstop control signal $u_{ES}$ and the skyhook control signal $u_{skyhook}$ will satisfy most conditions since the skyhook control subprocess is considering the absolute velocity $V_{abs\_seat}$ of seat 102 and the three endstop control subprocesses consider the relative motion which are correlated but are relatively independent quantities. However, the OEM may find that the stored kinetic energy in seat 102 (mitigated by the skyhook control subprocess) can overwhelm the relative control of the endstop control subprocesses, in which case, the summation of these terms can assist in the overall control of the attitude of the seat. The output of the Control Aggregation subprocess 164 is the damper control signal $u_{Ctrl}$. This value is used by system controller 110 to provide controllable input to the damper 106.

Tuning Process

Figure 11:
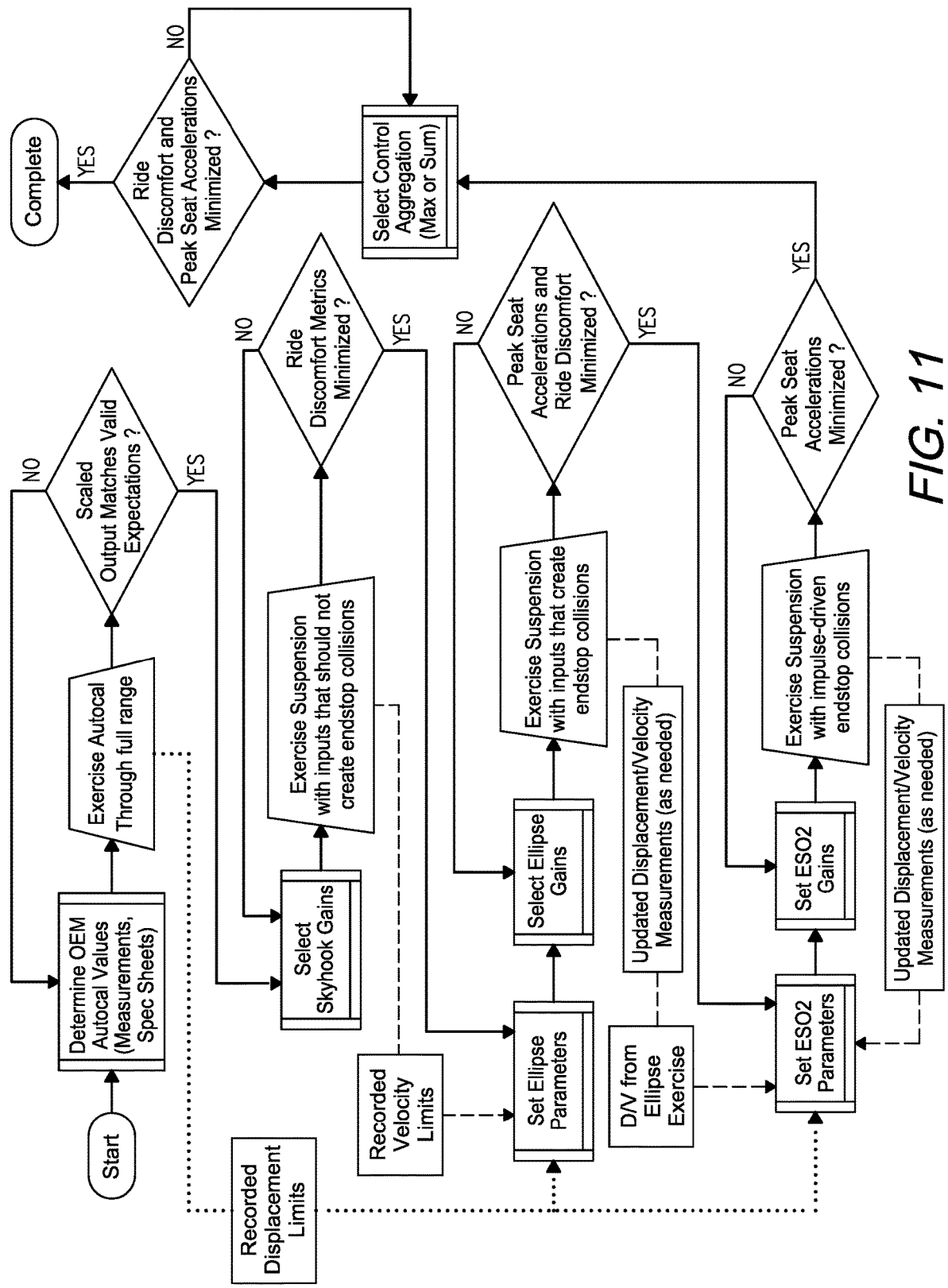
FIG. 11 is a flowchart of the tuning process associated with determining the parameter data input file (PDIF) elements.

To explain the tuning process, a non-limiting sequential example is used. Other OEM tuning processes may be used and may have different orders of operation for the tuning process. In this non-limiting example, the first step is to exercise the suspension and ensure the scaled displacement limits $x_{max/min\_scaled}$ match valid expectations from the AutoCalibration Subprocess 146. Then, the process tunes the Skyhook Control subprocess 160 to minimize ride discomfort by exercising the suspension with inputs that do not produce endstop collisions. The process next tunes the Ellipse Endstop Control subprocesses 152, 154 to minimize peak seat accelerations and ride discomfort by exercising the suspension with inputs that create endstop collisions. The next step in the process tunes the ESO2 Endstop Control subprocess 156 to minimize peak seat accelerations by exercising the suspension with impulse-driven endstop collisions. A decision is made on the maximum or summation for the Control Aggregation subprocess 164 based upon minimizing the ride discomfort and peak seat accelerations. Referring to FIG. 11, the tuning process illustrated follows the non-limiting example.

EXAMPLES

Figure 12:
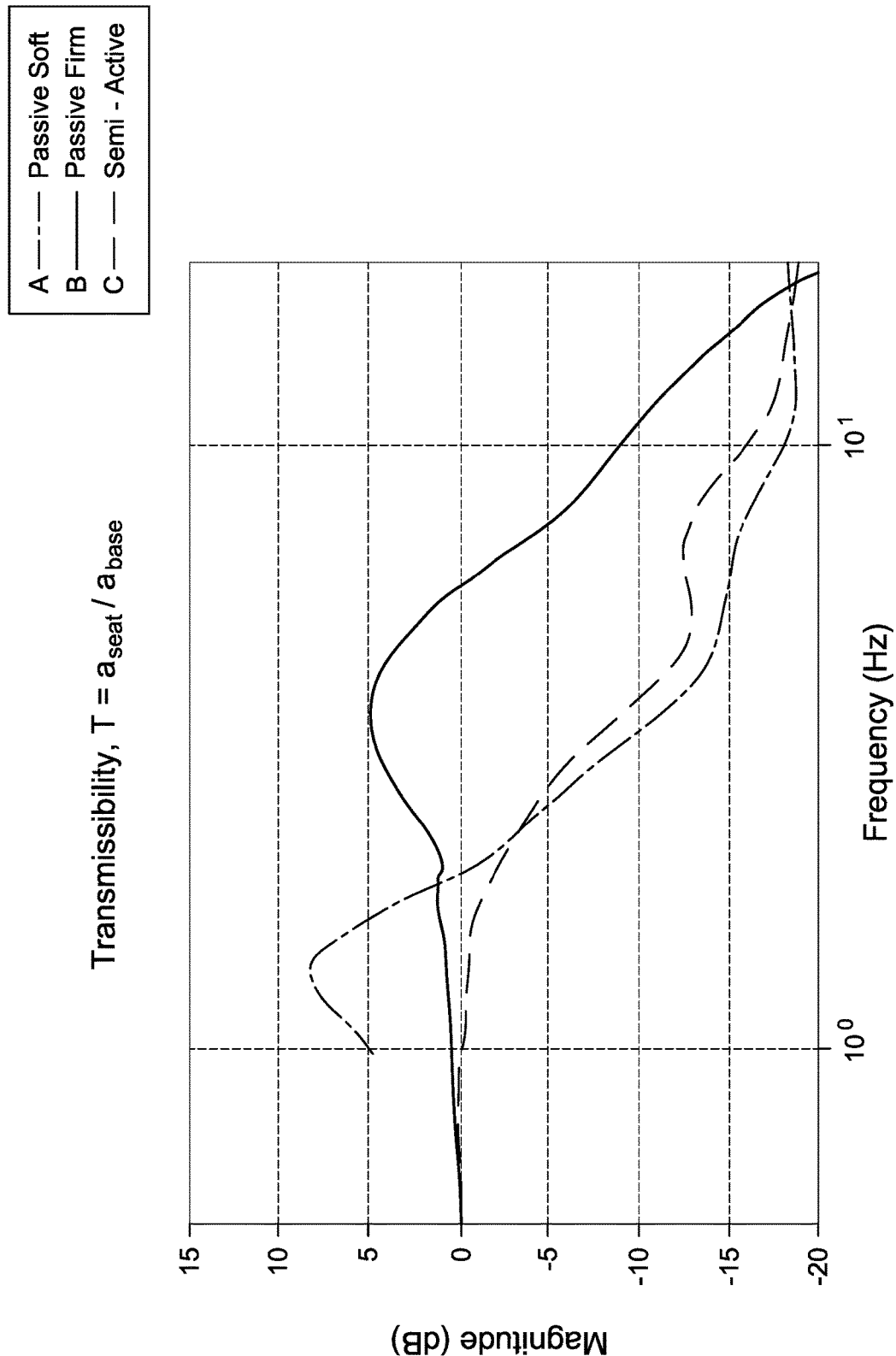
FIG. 12 is an illustration of a computer simulation of vibration transmissibility versus excitation frequency.

FIG. 12 illustrates a transmissibility plot of the claimed invention. In FIG. 12, a plot with three example transmissibility traces is shown and represents three different seat 102 suspension configurations. Transmissibility is the ratio of seat acceleration $a_{seat}$ to base acceleration $a_{base}$ (i.e., $a_{abs}$ of seat to $a_{abs}$ of base). The lower the transmissibility value, the less acceleration will be experienced by the seat occupant. As illustrated in FIG. 12, the transmissibility value of less than 0 dB indicates that seat 102 is attenuating base input. This attenuation results in the seat occupant experiencing less acceleration than is seen at the seat base 104. The transmissibility value of greater than 0 dB indicates that seat 102 is amplifying the base input. This amplification results in the seat occupant experiencing a greater level of acceleration than is seen at the seat base 104.

In configuration A, seat 102 is controlled using a soft passive damper 106 (i.e., a damper with a low resistance to motion). For an acceptable seat occupant ride, the transmissibility of damper 106 in configuration A will be acceptable when it is above the resonant frequency of the seat system. Stated otherwise, seat 102 will perform well when subjected to high frequency base inputs. However, base input frequencies around the resonant frequency of seat 102 will be significantly amplified. The result of the amplified base input frequencies result in large seat 102 motions in response to lower frequency base inputs. This amplified base input has a high probability of uncomfortable endstop hits.

In configuration B, seat 102 is controlled using a firm passive damper 106 (i.e., a damper with a high resistance to motion). For an acceptable seat occupant ride, the transmissibility of damper 106 in configuration B will be acceptable when it is around the seat resonant frequency. In this configuration, seat 102 will not significantly amplify base inputs around the resonant frequency. However, higher frequency base inputs (particularly in the 2-6 Hz range in this example) will be significantly amplified. This amplification of base inputs will result in a more uncomfortable ride for the seat occupant.

In configuration C, seat 102 is controlled by a semi-active damper using a skyhook algorithm. For configuration C, the transmissibility of seat 102 is acceptable around the seat resonant frequency, which is better than the performance of the firmly damped passive damper 106 for low frequency base inputs. This indicates that seat 102 will damp out the natural resonant response of seat 102, reducing the probability of uncomfortable endstop hits. In addition, the high frequency performance of seat 102 performs as well as the soft passive damper 106 for high frequency base inputs. The skyhook controlled semi-active damper 106 provides a combination of the best performance of both a firm passive damper, eliminating seat resonant effects, and a soft passive damper providing minimum transmissibility for high frequency base inputs. This will result in a more comfortable ride for the seat occupant than either a firm or soft passive damper 106.

The method of controlling the damping force of a seat damper positioned between the seat and the base, the seat damper having a seat controller providing control thereto comprises measuring an absolute acceleration ($a_{abs}$) of the seat or base and generating an acceleration signal. The method includes measuring an unscaled relative displacement ($x_{rel\_unscaled}$) of the seat relative to the base and generating a displacement signal. The method includes calculating a maximum unscaled displacement ($x_{max\_unscaled}$) and a minimum unscaled displacement ($x_{min\_unscaled}$) from an Autocalibration subprocess. The method includes calculating a relative scaled displacement ($x_{rel\_scaled}$), a maximum scaled displacement ($x_{max\_scaled}$), and a minimum scaled displacement ($x_{min\_scaled}$) using a standardized scaling subprocess. The method includes calculating an absolute velocity ($V_{abs\_seat}$) of the seat and a relative velocity ($V_{rel}$) of the seat relative to the base from a signal processing subprocess using the absolute acceleration ($a_{abs}$) and the scaled relative displacement ($x_{rel\_scaled}$). The method also includes using the plurality of input values for simultaneously determining a maximum endstop control signal ($u_{ES}$) and a skyhook control signal ($u_{skyhook}$), wherein the maximum endstop control signal ($u_{ES}$) is determined by simultaneously running an absolute ellipse endstop control process generating an absolute EEC endstop control signal ($Ctrl_{Ellipse\_abs}$), a relative ellipse endstop control process generating a relative EEC endstop control signal ($Ctrl_{Ellipse\_rel}$), and an ESO2 endstop control process generating an endstop control signal ($Ctrl_{ESO2}$), wherein the maximum of the three is selected as the maximum endstop control signals ($u_{ES}$), wherein the skyhook control signal ($u_{skyhook}$) is determined by running a skyhook control process and generating a skyhook control output ($Ctrl_{skyhook}$) and running a rising edge filter process on the skyhook control output ($Ctrl_{skyhook}$). The method further includes aggregating the maximum endstop control signal ($u_{ES}$) and the skyhook control signal ($u_{skyhook}$) to determine a desired seat performance by testing whether a sum of the maximum endstop control signal ($u_{ES}$) and the skyhook control signal ($u_{skyhook}$) provides the desired seat performance, or a maximum between the maximum endstop control signal ($u_{ES}$) or the skyhook control signal ($u_{skyhook}$) provides desired seat performance. And the method includes generating a damping force control signal ($u_{ctrl}$) based upon the desired seat performance and controlling the seat damper.

The AutoCalibration subprocess further compromises the steps of populating a nonvolatile random access memory (NVRAM) with a plurality of values from a last power cycle subprocess, a parameter data input file (PDIF) initialization subprocess, a continuous AutoCAL subprocess, an AutoCAL leak subprocess, and an overwrite subprocess, wherein some of the plurality of values are stored in a RAM include a previously stored maximum unscaled displacement ($x_{max\_unscaled\_old}$), a minimum unscaled displacement ($x_{min\_unscaled\_old}$), and more than one values of a PDIF, the PDIF being read during the PDIF initialization subprocess, the more than one values of the PDIF at least including an autocalibration maximum and minimum displacement ($x_{ACAL\_max/min}$) and an autocalibration tolerance up or down displacement ($x_{ACAL\_Tolerance\_up/dn}$), wherein the more than one values of the PDIF further including a value for an upper snubber thickness (Snubber_up) and a value for a lower snubber thickness (Snubber_dn).

The method of the continuous AutoCAL subprocess further includes the steps of determining if the previously stored maximum unscaled displacement ($x_{max\_unscaled\_old}$) and minimum unscaled displacement ($x_{min\_unscaled\_old}$) are valid, wherein if they are invalid then an AutoCAL range is reset to the value in the PDIF for the autocalibration maximum displacement ($x_{ACAL\_max}$) minus the upper snubber thickness (Snubber_up) and the value of the autocalibration minimum displacement ($x_{ACAL\_min}$) plus the lower snubber thickness (Snubber_dn), wherein if they are valid then the current values for the maximum unscaled displacement ($x_{max\_unscaled\_old}$) and the current value of the minimum unscaled displacement ($x_{max\_unscaled\_old}$) in the NVRAM are retained.

The method of the continuous AutoCal subprocess also includes subtracting the upper snubber thickness (Snubber_up) from the unscaled relative displacement ($x_{rel\_unscaled}$) of the seat and determining if the difference is greater than the maximum unscaled displacement ($x_{max\_unscaled}$) and if the difference is greater than the maximum unscaled displacement ($x_{max\_unscaled}$), determining if the unscaled relative displacement ($x_{rel\_unscaled}$) is greater than the autocalibration tolerance up displacement ($x_{ACAL\_Tolerance\_up}$), wherein if the unscaled relative displacement ($x_{rel\_unscaled}$) is not greater than the autocalibration tolerance up displacement ($x_{ACAL\_Tolerance\_up}$) writing the unscaled relative displacement ($x_{rel\_unscaled}$) of the seat minus the upper snubber thickness (Snubber_up) to the NVRAM, wherein if the difference of subtracting the upper snubber thickness (Snubber_up) from the unscaled relative displacement ($x_{rel\_unscaled}$) of the seat is less than or equal to the maximum unscaled displacement ($x_{max\_unscaled}$) then the current value of the maximum unscaled displacement ($x_{max\_unscaled\_old}$) in the NVRAM are retained, wherein if the unscaled relative displacement ($x_{rel\_unscaled}$) is greater than or equal to the autocalibration tolerance up displacement ($x_{ACAL\_Tolerance\_up}$) then the current value of the maximum unscaled displacement ($x_{max\_unscaled\_old}$) in the NVRAM are retained.

The method of the continuous AutoCal subprocess further includes adding the lower snubber thickness (Snubber_dn) and the unscaled relative displacement ($x_{rel\_unscaled}$) of the seat and determining if the sum is less than the minimum unscaled displacement ($x_{min\_unscaled}$) and if the sum is less than the minimum unscaled displacement ($x_{min\_unscaled}$), determining if the unscaled relative displacement ($x_{rel\_unscaled}$) is less than the autocalibration tolerance down displacement ($x_{ACAL\_Tolerance\_dn}$), wherein if the unscaled relative displacement ($x_{rel\_unscaled}$) is not less than the autocalibration tolerance down displacement ($x_{ACAL\_Tolerance\_dn}$) writing the result of the sum of the unscaled relative displacement ($x_{rel\_unscaled}$) of the seat and the lower snubber thickness (Snubber_dn) to the NVRAM, wherein if the sum of adding the lower snubber thickness (Snubber_dn) to the unscaled relative displacement ($x_{rel\_unscaled}$) of the seat is greater than or equal to the minimum unscaled displacement ($x_{min\_unscaled}$) then the current value of the minimum unscaled displacement ($x_{min\_unscaled\_old}$) in the NVRAM is retained, wherein if the unscaled relative displacement ($x_{rel\_unscaled}$) is less than or equal to the autocalibration tolerance down displacement ($x_{ACAL\_Tolerance\_dn}$) then the current value of the minimum unscaled displacement ($x_{min\_unscaled\_old}$) in the NVRAM is retained.

The method of the AutoCAL leak subprocess comprises the steps of determining if a time is true for a time t1, and if true initiate the AutoCAL leak subprocess; subtracting a leakage value ($x_{ACAL\_leak}$) from the previously stored maximum unscaled displacement ($x_{max\_unscaled\_old}$) and the difference is written to the NVRAM if the difference is less than or equal to the autocalibration tolerance up displacement ($x_{CAL\_Tolerance\_up}$) and greater than or equal to the autocalibration maximum displacement ($x_{ACAL\_max}$) minus the upper snubber thickness (Snubber_up); and adding the leakage value ($x_{ACAL\_leak}$) to the previously stored minimum unscaled displacement ($x_{min\_unscaled\_old}$) and the sum is written to the NVRAM if the sum is greater than or equal to the autocalibration tolerance down displacement ($x_{ACAL\_Tolerance\_dn}$) and less than or equal to the autocalibration minimum displacement ($x_{ACAL\_Tolerance\_dn}$) plus the lower snubber thickness (Snubber_dn).

The method wherein the overwrite subprocess uses input from the continuous AutoCAL subprocess and the AutoCAL leak subprocess to write a current value for the maximum unscaled displacement ($x_{max\_unscaled}$) and the minimum unscaled displacement ($x_{min\_unscaled}$) to the NVRAM.

The method wherein the signal processing subprocess further comprises the steps of measuring a displacement of the seat using a digital displacement sensor or an analog displacement sensor; processing data from the digital displacement sensor with a digital low pass filter to match to an accelerometer analog low pass anti-alias filter if paired with an analog accelerometer, or processing the analog displacement sensor matched with an analog low pass anti-alias filter, if paired with either the analog accelerometer or a digital accelerometer; processing output from the digital low pass filter matched to the accelerometer analog low pass anti-alias filter or the analog low pass anti-alias filter with a bandwidth limited differentiator; processing output from the bandwidth limited differentiator with a high pass filter matched to an accelerometer base washout filter; and processing output from the high pass filter with a second high pass filter matched to an accelerometer leaky integrator, wherein output from the second high pass filter is the relative velocity ($V_{rel}$) of the seat relative to the base.

The method wherein the signal processing subprocess further comprises the steps of measuring an acceleration of the seat using the digital accelerometer or an analog accelerometer; processing data from the digital accelerometer with a digital low pass filter to match with an analog displacement sensor low pass anti-alias filter if paired with the analog displacement sensor, or processing the analog accelerometer with an analog low pass anti-alias filter if paired with either the digital displacement sensor or the analog displacement sensor; processing output from the digital low pass filter to match with the analog displacement sensor low pass anti-alias filter or the analog low pass anti-alias filter with a base washout digital high pass filter; processing output from the base washout digital high pass filter with a low pass filter and matching for a bandwidth limited differentiator of the displacement sensor; and processing output from the low pass filter with a leak integrator, wherein output from the leaky integrator is the absolute velocity ($V_{abs\_seat}$) of the seat or an absolute velocity ($V_{abs\_base}$) of the base.

The method wherein the signal processing subprocess further comprises the steps of measuring a displacement of the seat using a digital displacement sensor when paired with a digital accelerometer; processing output from the digital displacement sensor processing with a bandwidth limited differentiator; processing output from the bandwidth limited differentiator with a high pass filter to match to an accelerometer base washout filter; processing output from the high pass filter with a second high pass filter to match to an accelerometer leaky integrator, wherein output from the second high pass filter is the relative velocity ($V_{rel}$) of the seat relative to the base; measuring an acceleration of the seat using the digital accelerometer; processing data from the digital accelerometer with a base washout digital high pass filter; processing output from the base washout digital high pass filter with a low pass filter to match to the displacement sensor bandwidth limited differentiator; and processing output from the low pass filter with a leak integrator, wherein output from the leaky integrator is the absolute velocity ($V_{abs\_seat}$) of the seat or an absolute velocity ($V_{abs\_base}$) of the base.

The method wherein the absolute EEC subprocess and the relative EEC subprocess further comprises an ellipse parameter selection subprocess; a dynamic velocity component subprocess; a dynamic displacement component subprocess; and an ellipse control calculation subprocess, wherein the ellipse control calculation generates the absolute EEC endstop control signal (Ctrl$_{Ellipse\_abs}$) and/or the relative EEC endstop control signal (Ctrl$_{Ellipse\_rel}$).

The method wherein the ellipse parameter selection subprocess further comprises the steps of determining if the seat is extending or compressing based upon the relative velocity (V$_{rel}$) of the seat; communicating at least one stored value from a parameter data input file (PDIF) to the dynamic velocity component subprocess, the dynamic displacement component subprocess, and the ellipse control calculation subprocess; wherein the stored values communicated to the dynamic velocity component subprocess include a displacement radius up or down (x$_{Radius\_up/dn}$); wherein the stored values communicated to the dynamic displacement component subprocess include the displacement radius up or down (x$_{Radius\_up/dn}$), a relative or absolute velocity radius up or down (V$_{rel/abs\_Radius\_up/dn}$), and an offset displacement up or down (x$_{Offset\_up/dn}$); and wherein the stored values communicated to the ellipse control calculation subprocess include a relative or absolute velocity elliptical gain up or down (G$_{Elliptical\_rel/abs\_up/dn}$).

The method wherein the dynamic velocity component subprocess further comprises the steps of squaring the displacement radius up or down (x$_{Radius\_up/dn}$) and writing a squared displacement radius (x$_{Radius}^2$) value to a random access memory (RAM); squaring the relative velocity (V$_{rel}$) of the seat or the absolute velocity (V$_{abs}$) of the seat as a squared relative or absolute velocity (V$_{rel/abs}^2$); generating a squared product (x$_{Radius}^2$V$_{rel/abs}^2$) value by multiplying the squared displacement radius (x$_{Radius}^2$) with the squared relative or absolute velocity (V$_{rel/abs}^2$), and writing the squared product (x$_{Radius}^2$V$_{rel/abs}^2$) value to the RAM; and communicating the squared displacement radius (x$_{Radius}^2$) and the squared product (x$_{Radius}^2$V$_{rel/abs}^2$) value to the ellipse control calculation subprocess.

The method wherein the dynamic displacement component subprocess further comprises the steps of squaring the relative or absolute velocity radius up or down (V$_{rel/abs\_Radius\_up/dn}$) and writing a squared relative or absolute velocity radius up or down (V$_{rel/abs\_Radius\_up/dn}^2$) value to the RAM; calculating an ellipse up or down center (x$_{Elliptical\_up/dn}$) displacement from an ellipse up center (x$_{Elliptical\_up}$) displacement by subtracting the displacement radius up (x$_{Radius\_up}$), the offset displacement up (x$_{Offset\_up}$), and the scaled relative displacement (x$_{rel\_scaled}$) from the maximum scaled displacement (x$_{max\_scaled}$) and squaring the resultant value, or by calculating the elliptical up or down center (x$_{Elliptical\_up/dn}$) displacement from an ellipse down center (x$_{Elliptical\_dn}$) displacement by subtracting the displacement radius down (x$_{Radius\_dn}$), the offset displacement down (x$_{Offset\_dn}$), and the minimum scaled displacement (x$_{min\_scaled}$) from the scaled relative displacement (x$_{rel\_scaled}$) and squaring the resultant value, writing either of a square of the ellipse center up displacement (x$_{Elliptical\_up}^2$) value or a square of the ellipse center down displacement (x$_{Elliptical\_dn}^2$) value to the RAM; multiplying the squared relative or absolute velocity radius up or down (V$_{rel/abs\_Radius\_up/dn}^2$) by either the square of the ellipse center up (x$_{Elliptical\_up}^2$) value or the square of the ellipse center down (x$_{Elliptical\_dn}^2$) value and writing a squared elliptical displacement squared relative or absolute velocity radius (x$_{Elliptical\_up/dn}^2$V$_{rel/abs\_Radius\_up/dn}^2$) value to the RAM; and communicating the squared elliptical displacement squared relative or absolute velocity radius (x$_{Elliptical\_up/dn}^2$V$_{rel/abs\_Radius\_up/dn}^2$) value to the ellipse control calculation subprocess.

The method wherein the ellipse control calculation subprocess further comprises the steps of adding the squared product (x$_{Radius}^2$V$_{rel/abs}^2$) value of the squared displacement radius (x$_{Radius}^2$) and the square of the relative or absolute velocity (V$_{rel/abs}^2$) with the product of a squared elliptical displacement from the ellipse center up or down (x$_{Elliptical\_up/dn}^2$) and the squared relative or absolute velocity radius up or down (V$_{rel/abs\_Radius\_up/dn}^2$) to determine a penetration value; multiplying the squared relative or absolute velocity radius up or down (V$_{rel/abs\_Radius\_up/dn}^2$) with the squared displacement radius (x$_{Radius}^2$) to determine an ellipse boundary value; determining if the penetration value is greater than zero, if so, writing the difference between the penetration value and the ellipse boundary value to the RAM, and if not, writing zero to the RAM; multiplying the result of the determining step associated with the penetration value with the relative or absolute velocity elliptical gain up or down (G$_{Elliptical\_rel/abs\_up/dn}$) and generating either the absolute EEC endstop control signal (Ctrl$_{Ellipse\_abs}$) and/or the relative EEC endstop control signal (Ctrl$_{Ellipse\_rel}$).

The method of claim 1, wherein the ESO2 endstop control subprocess further comprises the steps of determining if the seat is extending or compressing based upon the relative velocity (V$_{rel}$) of the seat; determining if the relative velocity (V$_{rel}$) is greater or less than zero; determining a displacement distance to an opposite stop (x$_{dist\_to\_opp\_stop}$) is determining a distance from a top endstop when the relative velocity (V$_{rel}$) is less than zero by subtracting the scaled relative displacement (x$_{rel\_scaled}$) from the maximum scaled displacement (x$_{max\_scaled}$), or by determining a distance from a bottom endstop when the relative velocity (V$_{rel}$) is greater than zero by subtracting the minimum scaled displacement (x$_{min\_scaled}$) from the scaled relative displacement (x$_{rel\_scaled}$); determining an ESO2 endstop magnitude (ESO2$_{Magnitude}$) by determining the difference between an absolute value of the relative velocity (|V$_{rel}$|) and a relative velocity limit up (V$_{lim\_up}$) and multiplying the resulting difference by a gain value up (G$_{ESO2\_up}$), or by determining the difference between the absolute value of the relative velocity (|V$_{rel}$|) and a relative velocity limit down (V$_{lim\_dn}$) and multiplying the resulting difference by a gain value down (G$_{ESO2\_dn}$); determining if a velocity trigger (V$_{Trigger}$) value is true when the relative velocity limit up or down (V$_{lim\_up/dn}$) is subtracted from the absolute value of the relative velocity (|V$_{rel}$|) and the difference is greater than or equal to zero, and by determining if the velocity trigger (V$_{Trigger}$) value is false when the relative velocity limit up or down (V$_{lim\_up/dn}$) is subtracted from the absolute value of the relative velocity (|V$_{rel}$|) and the difference is less than zero, wherein the velocity trigger (V$_{Trigger}$) is enabled if true and is disabled if false; determining if a displacement trigger (x$_{Trigger}$) value is true when a displacement distance to the opposite stop (x$_{dist\_to\_opp\_stop}$) is subtracted from a displacement limit up or down (x$_{lim\_up/dn}$) and the difference is greater than or equal to zero, and by determining if the displacement trigger (x$_{Trigger}$) value is false when a displacement distance to the opposite stop (x$_{dist\_to\_opp\_stop}$) is subtracted from a displacement limit up or down (x$_{lim\_up/dn}$) and the difference is less than zero, wherein the displacement trigger (x$_{Trigger}$) is enabled if true and is disabled if false; determining an ESO2 cyclic trigger by determining a maximum value between the displacement trigger (x$_{Trigger}$) and a previous session ESO2 trigger; multiplying the ESO2 cyclic trigger by the velocity trigger (V$_{Trigger}$) value to determine a current ESO2 trigger; multiplying the current ESO2 trigger by the ESO2 endstop magnitude (ESO2$_{Magnitude}$) to determine the ESO2 control signal (Ctrl$_{ESO2}$).

The method wherein the skyhook control subprocess further comprises the steps of determining if a product of absolute velocity (V$_{abs\_seat}$) of the seat multiplied by the relative velocity ($V_{rel}$) of the seat is greater than zero; setting the value for the skyhook control signal ($Ctrl_{skyhook}$) to zero when the product is less than or equal to zero; and multiplying a viscous damping coefficient ($C_{sky}$) by the absolute velocity ($V_{abs\_seat}$) of the seat to determine a value of the skyhook control signal ($Ctrl_{skyhook}$).

The method wherein the rising edge filter subprocess further comprises the steps of processing the skyhook control signal ($Ctrl_{skyhook}$) through a single pole low pass filter; determining that if a first response (A) from the single pole low pass filter is less than or equal to a second response (B), then the skyhook control signal ($u_{skyhook}$) is equal to a value of the single pole low pass filter of the skyhook control signal ($Ctrl_{skyhook}$); and determining that if the first response (A) from the single pole low pass filter is greater than the second response (B), then the skyhook control signal ($u_{skyhook}$) is equal to a value of the skyhook control signal ($Ctrl_{skyhook}$) from the skyhook control subprocess.

Other embodiments of the present invention will be apparent to one skilled in the art. As such, the foregoing description merely enables and describes the general uses and methods of the present invention. Accordingly, the following claims define the true scope of the present invention.

What is claimed is:

1. A method of controlling a damping force of a seat damper positioned between a seat and a base, the seat damper having a seat controller providing control thereto, the method comprising:
   measuring and calculating a plurality of input values, the plurality of input including the steps of:
      measuring an absolute acceleration ($a_{abs}$) of the seat or base and generating an acceleration signal;
      measuring an unscaled relative displacement ($x_{rel\_unscaled}$) of the seat relative to the base and generating a displacement signal;
      calculating a maximum unscaled displacement ($x_{max\_unscaled}$) and a minimum unscaled displacement ($x_{min\_unscaled}$) from an AutoCalibration subprocess;
      calculating a scaled relative displacement ($x_{rel\_scaled}$), a maximum scaled displacement ($x_{max\_scaled}$), and a minimum scaled displacement ($x_{min\_scaled}$) using a standardized scaling subprocess;
      calculating an absolute velocity ($V_{abs\_seat}$) of the seat and a relative velocity ($V_{rel}$) of the seat relative to the base from a signal processing subprocess using the absolute acceleration ($a_{abs}$) and the scaled relative displacement ($x_{rel\_scaled}$);
   using the plurality of input values simultaneously determining a maximum endstop control signal ($u_{ES}$) and a skyhook control signal ($u_{skyhook}$), wherein the maximum endstop control signal ($u_{ES}$) is determined by simultaneously running an absolute ellipse endstop control (EEC) subprocess generating an absolute EEC endstop control signal ($Ctrl_{Ellipse\_abs}$), a relative EEC subprocess generating a relative EEC endstop control signal ($Ctrl_{Ellipse\_rel}$), and an ESO2 endstop control subprocess generating an endstop control signal ($Ctrl_{ESO2}$), wherein the maximum of the three is selected as the maximum endstop control signals (LES), wherein the skyhook control signal ($Ctrl_{skyhook}$) is determined by running a skyhook control subprocess and generating a skyhook control signal ($Ctrl_{skyhook}$) and running a rising edge filter subprocess on the skyhook control signal ($Ctrl_{skyhook}$);
   aggregating the maximum endstop control signal ($u_{ES}$) and the skyhook control signal ($u_{skyhook}$) to determine a desired seat performance by testing whether a sum of the maximum endstop control signal ($u_{ES}$) and the skyhook control signal ($u_{skyhook}$) provides the desired seat performance, or a maximum between the maximum endstop control signal ($u_{ES}$) or the skyhook control signal ($u_{skyhook}$) provides desired seat performance;
   generating a damping force control signal ($u_{Ctrl}$) based upon the desired seat performance; and
   controlling the seat damper.

2. The method of claim 1, wherein the AutoCalibration subprocess further comprises the steps of populating a nonvolatile random access memory (NVRAM) with a plurality of values from a last power cycle subprocess, a parameter data input file (PDIF) initialization subprocess, a continuous AutoCAL subprocess, an AutoCAL leak subprocess, and an overwrite subprocess, wherein some of the plurality of values are stored in a RAM include a previously stored maximum unscaled displacement ($x_{max\_unscaled\_old}$), a minimum unscaled displacement ($x_{min\_unscaled\_old}$), and more than one values of a PDIF, the PDIF being read during the PDIF initialization subprocess, the more than one values of the PDIF at least including an autocalibration maximum and minimum displacement ($x_{ACAL\_max/min}$) and an autocalibration tolerance up or down displacement ($x_{ACAL\_Tolerance\_up/dn}$), wherein the more than one values of the PDIF further including a value for an upper snubber thickness (Snubber_up) and a value for a lower snubber thickness (Snubber_dn).

3. The method of claim 2, wherein the continuous AutoCAL subprocess further includes the steps of:
   determining if the previously stored maximum unscaled displacement ($x_{max\_unscaled\_old}$) and minimum unscaled displacement ($x_{min\_unscaled\_old}$) are valid, wherein if they are invalid then an AutoCAL range is reset to the value in the PDIF for the autocalibration maximum displacement ($x_{ACAL\_max}$) minus the upper snubber thickness (Snubber_up) and the value of the autocalibration minimum displacement ($x_{ACAL\_min}$) plus the lower snubber thickness (Snubber_dn), wherein if they are valid then the previously stored value for the maximum unscaled displacement ($x_{max\_unscaled\_old}$) and the previously stored value of the minimum unscaled displacement ($x_{min\_unscaled\_old}$) in the NVRAM are retained;
   subtracting the upper snubber thickness (Snubber_up) from the unscaled relative displacement ($x_{rel\_unscaled}$) of the seat and determining if the difference is greater than the maximum unscaled displacement ($x_{max\_unscaled}$) and if the difference is greater than the maximum unscaled displacement ($x_{max\_unscaled}$), determining if the unscaled relative displacement ($x_{rel\_unscaled}$) is greater than the autocalibration tolerance up displacement ($x_{ACAL\_Tolerance\_up}$), wherein if the unscaled relative displacement ($x_{rel\_unscaled}$) is not greater than the autocalibration tolerance up displacement ($x_{ACAL\_Tolerance\_up}$) writing the unscaled relative displacement ($x_{rel\_unscaled}$) of the seat minus the upper snubber thickness (Snubber_up) to the NVRAM, wherein if the difference of subtracting the upper snubber thickness (Snubber_up) from the unscaled relative displacement ($x_{rel\_unscaled}$) of the seat is less than or equal to the maximum unscaled displacement ($x_{max\_unscaled}$) then the current value of the maximum unscaled displacement ($x_{max\_unscaled\_old}$) in the NVRAM are retained, wherein if the unscaled relative displacement ($x_{rel\_unscaled}$) is greater than or equal to the autocalibration tolerance up displacement ($x_{ACAL\_Tolerance\_up}$) then the current value of the maximum unscaled displacement ($x_{max\_unscaled\_old}$) in the NVRAM are retained; and adding the lower snubber thickness (Snubber_dn) and the unscaled relative displacement ($x_{rel\_unscaled}$) of the seat and determining if the sum is less than the minimum unscaled displacement ($x_{min\_unscaled}$) and if the sum is less than the minimum unscaled displacement ($x_{min\_unscaled}$), determining if the unscaled relative displacement ($x_{rel\_unscaled}$) is less than the autocalibration tolerance down displacement ($x_{ACAL\_Tolerance\_dn}$), wherein if the unscaled relative displacement ($x_{rel\_unscaled}$) is not less than the autocalibration tolerance down displacement ($x_{ACAL\_Tolerance\_dn}$) writing the result of the sum of the unscaled relative displacement ($x_{rel\_unscaled}$) of the seat and the lower snubber thickness (Snubber_dn) to the NVRAM, wherein if the sum of adding the lower snubber thickness (Snubber_dn) to the unscaled relative displacement ($x_{rel\_unscaled}$) of the seat is greater than or equal to the minimum unscaled displacement ($x_{min\_unscaled}$) then the current value of the minimum unscaled displacement ($x_{min\_unscaled\_old}$) in the NVRAM is retained, wherein if the unscaled relative displacement ($x_{rel\_unscaled}$) is less than or equal to the autocalibration tolerance down displacement ($x_{ACAL\_Tolerance\_dn}$) then the current value of the minimum unscaled displacement ($x_{min\_unscaled\_old}$) in the NVRAM is retained.

4. The method of claim 3, wherein the AutoCAL leak subprocess further comprises the steps of:

determining if a time is true for a time t1, and if true initiate the AutoCAL leak subprocess;

subtracting a leakage value ($x_{ACAL\_leak}$) from the previously stored maximum unscaled displacement ($x_{max\_unscaled\_old}$) and the difference is written to the NVRAM if the difference is less than or equal to the autocalibration tolerance up displacement ($x_{ACAL\_Tolerance\_up}$) and greater than or equal to the autocalibration maximum displacement ($x_{ACAL\_max}$) minus the upper snubber thickness (Snubber_up); and adding the leakage value ($x_{ACAL\_leak}$) to the previously stored minimum unscaled displacement ($x_{min\_unscaled\_old}$) and the sum is written to the NVRAM if the sum is greater than or equal to the autocalibration tolerance down displacement ($x_{ACAL\_Tolerance\_dn}$) and less than or equal to the autocalibration minimum displacement ($x_{ACAL\_min}$) plus the lower snubber thickness (Snubber_dn).

5. The method of claim 3, wherein the overwrite subprocess uses input from the continuous AutoCAL subprocess and the AutoCAL leak subprocess to write a current value for the maximum unscaled displacement ($x_{max\_unscaled}$) and the minimum unscaled displacement ($x_{min\_unscaled}$) to the NVRAM.

6. The method of claim 1, wherein the signal processing subprocess further comprises the steps of:

measuring a displacement of the seat using a digital displacement sensor or an analog displacement sensor;

processing data from the digital displacement sensor with a digital low pass filter to match to an accelerometer analog low pass anti-alias filter if paired with an analog accelerometer, or processing the analog displacement sensor with an analog low pass anti-alias filter, if paired with either the analog accelerometer or a digital accelerometer;

processing output from the digital low pass filter to match to the accelerometer analog low pass anti-alias filter or the analog low pass anti-alias filter with a bandwidth limited differentiator;

processing output from the bandwidth limited differentiator with a high pass filter to match to an accelerometer base washout filter; and processing output from the high pass filter with a second high pass filter to match to an accelerometer leaky integrator, wherein output from the second high pass filter is the relative velocity ($V_{rel}$) of the seat relative to the base.

7. The method of claim 6, wherein the signal processing subprocess further comprises the steps of:

measuring an acceleration of the seat using the digital accelerometer or an analog accelerometer;

processing data from the digital accelerometer with a digital low pass filter to match with an analog displacement sensor low pass anti-alias filter if paired with the analog displacement sensor, or processing the analog accelerometer with an analog low pass anti-alias filter if paired with either the digital displacement sensor or the analog displacement sensor;

processing output from the digital low pass filter to match with an analog displacement sensor low pass anti-alias filter or the analog low pass anti-alias filter with a base washout digital high pass filter;

processing output from the base washout digital high pass filter with a low pass filter and matching for a bandwidth limited differentiator of the displacement sensor; and processing output from the low pass filter with a leak integrator, wherein output from the leaky integrator is the absolute velocity ($V_{abs\_seat}$) of the seat or an absolute velocity ($V_{abs\_base}$) of the base.

8. The method of claim 1, wherein the signal processing subprocess further comprises the steps of:

measuring a displacement of the seat using a digital displacement sensor when paired with a digital accelerometer;

processing output from the digital displacement sensor processing with a bandwidth limited differentiator;

processing output from the bandwidth limited differentiator with a high pass filter to match to an accelerometer base washout filter;

processing output from the high pass filter with a second high pass filter to match to an accelerometer leaky integrator, wherein output from the second high pass filter is the relative velocity ($V_{rel}$) of the seat relative to the base;

measuring an acceleration of the seat using the digital accelerometer;

processing data from the digital accelerometer with a base washout digital high pass filter;

processing output from the base washout digital high pass filter with a low pass filter to match to the displacement sensor bandwidth limited differentiator; and processing output from the low pass filter with a leak integrator, wherein output from the leaky integrator is the absolute velocity ($V_{abs\_seat}$) of the seat or an absolute velocity ($V_{abs\_base}$) of the base.

9. The method of claim 1, wherein the absolute EEC subprocess and the relative EEC subprocess further comprises:

an ellipse parameter selection subprocess;
a dynamic velocity component subprocess;
a dynamic displacement component subprocess; and an ellipse control calculation subprocess, wherein the ellipse control calculation generates the absolute EEC endstop control signal ($Ctrl_{Ellipse\_abs}$) and/or the relative EEC endstop control signal ($Ctrl_{Ellipse\_rel}$).

10. The method of claim 9, wherein the ellipse parameter selection subprocess further comprises the steps of:
   determining if the seat is extending or compressing based upon the relative velocity ($V_{rel}$) of the seat;
   communicating at least one stored value from a parameter data input file (PDIF) to the dynamic velocity component subprocess, the dynamic displacement component subprocess, and the ellipse control calculation subprocess;
   wherein the stored values communicated to the dynamic velocity component subprocess include a displacement radius up or down ($x_{Radius\_up/dn}$);
   wherein the stored values communicated to the dynamic displacement component subprocess include the displacement radius up or down ($x_{Radius\_up/dn}$), a relative or absolute velocity radius up or down ($V_{rel/abs\_Radius\_up/dn}$), and an offset displacement up or down ($x_{Offset\_up/dn}$); and
   wherein the stored values communicated to the ellipse control calculation subprocess include a relative or absolute velocity elliptical gain up or down ($G_{Elliptical\_rel/abs\_up/dn}$).

11. The method of claim 10, wherein the dynamic velocity component subprocess further comprises the steps of:
   squaring the displacement radius up or down ($x_{Radius\_up/dn}$) and writing a squared displacement radius ($x_{Radius}^2$) value to a random access memory (RAM);
   squaring the relative velocity ($V_{rel}$) of the seat or the absolute velocity ($V_{abs}$) of the seat as a squared relative or absolute velocity ($V_{rel/abs}^2$);
   generating a squared product ($x_{Radius}^2 V_{rel/abs}^2$) value by multiplying the squared displacement radius ($x_{Radius}^2$) with the squared relative or absolute velocity ($V_{rel/abs}^2$), and writing the squared product ($x_{Radius}^2 V_{rel/abs}^2$) value to the RAM; and
   communicating the squared displacement radius ($x_{Radius}^2$) and the squared product ($x_{Radius}^2 V_{rel/abs}^2$) value to the ellipse control calculation subprocess.

12. The method of claim 11, wherein the dynamic displacement component subprocess further comprises the steps of:
   squaring the relative or absolute velocity radius up or down ($V_{rel/abs\_Radius\_up/dn}$) and writing a squared relative or absolute velocity radius up or down ($V_{rel/abs\_Radius\_up/dn}^2$) value to the RAM;
   calculating an ellipse up or down center ($x_{Elliptical\_up/dn}$) displacement from an ellipse up center ($x_{Elliptical\_up}$) displacement by subtracting the displacement radius up ($x_{Radius\_up}$), the offset displacement up ($x_{Offset\_up}$), and the scaled relative displacement ($x_{rel\_scaled}$) from the maximum scaled displacement ($x_{max\_scaled}$) and squaring the resultant value, or by calculating the elliptical up or down center ($x_{Elliptical\_up/dn}$) displacement from an ellipse down center ($x_{Elliptical\_dn}$) displacement by subtracting the displacement radius down ($x_{Radius\_dn}$), the offset displacement down ($x_{Offset\_dn}$), and the minimum scaled displacement ($x_{min\_scaled}$) from the scaled relative displacement ($x_{rel\_scaled}$) and squaring the resultant value, writing either of a square of the ellipse center up displacement ($x_{Elliptical\_up}^2$) value or a square of the ellipse center down displacement ($x_{Elliptical\_dn}^2$) value to the RAM;
   multiplying the squared relative or absolute velocity radius up or down ($V_{rel/abs\_Radius\_up/dn}^2$) by either the square of the ellipse center up ($x_{Elliptical\_up}^2$) value or the square of the ellipse center down ($x_{Elliptical\_dn}^2$) value and writing a squared elliptical displacement squared relative or absolute velocity radius ($x_{Elliptical\_up/dn}^2 V_{rel/abs\_Radius\_up/dn}^2$) value to the RAM; and
   communicating the squared elliptical displacement squared relative or absolute velocity radius ($x_{Elliptical\_up/dn}^2 V_{rel/abs\_Radius\_up/dn}^2$) value to the ellipse control calculation subprocess.

13. The method of claim 12, wherein the ellipse control calculation subprocess further comprises the steps of:
   adding the squared product ($x_{Radius}^2 V_{rel/abs}^2$) value of the squared displacement radius ($x_{Radius}^2$) and the square of the relative or absolute velocity ($V_{rel/abs}^2$) with the product of a squared elliptical displacement from the ellipse center up or down ($x_{Elliptical\_up/dn}^2$) and the squared relative or absolute velocity radius up or down ($V_{rel/abs\_Radius\_up/dn}^2$) to determine a penetration value;
   multiplying the squared relative or absolute velocity radius up or down ($V_{rel/abs\_Radius\_up/dn}^2$) with the squared displacement radius ($x_{Radius}^2$) to determine an ellipse boundary value;
   determining if the penetration value is greater than zero, if so, writing the difference between the penetration value and the ellipse boundary value to the RAM, and if not, writing zero to the RAM;
   multiplying the result of the determining step associated with the penetration value with the relative or absolute velocity elliptical gain up or down ($G_{Elliptical\_rel/abs\_up/dn}$) and generating either the absolute EEC endstop control signal ($Ctrl_{Ellipse\_abs}$) and/or the relative EEC endstop control signal ($Ctrl_{Ellipse\_rel}$).

14. The method of claim 1, wherein the ESO2 endstop control subprocess further comprises the steps of:
   determining if the seat is extending or compressing based upon the relative velocity ($V_{rel}$) of the seat;
   determining if the relative velocity ($V_{rel}$) is greater or less than zero;
   determining a displacement distance to an opposite stop ($x_{dist\_to\_opp\_stop}$) is determining a distance from a top endstop when the relative velocity ($V_{rel}$) is less than or equal to zero by subtracting the scaled relative displacement ($x_{rel\_scaled}$) from the maximum scaled displacement ($x_{max\_scaled}$), or by determining a distance from a bottom endstop when the relative velocity ($V_{rel}$) is greater than zero by subtracting the minimum scaled displacement ($x_{min\_scaled}$) from the scaled relative displacement ($x_{rel\_scaled}$);
   determining an ESO2 endstop magnitude ($ESO2_{Magnitude}$) by determining the difference between an absolute value of the relative velocity ($|V_{rel}|$) and a relative velocity limit up ($V_{lim\_up}$) and multiplying the resulting difference by a gain value up ($G_{ESO2\_up}$), or by determining the difference between the absolute value of the relative velocity ($|V_{rel}|$) and a relative velocity limit down ($V_{lim\_dn}$) and multiplying the resulting difference by a gain value down ($G_{ESO2\_dn}$);
   determining if a velocity trigger ($V_{Trigger}$) value is true when the relative velocity limit up or down ($V_{lim\_up/dn}$) is subtracted from the absolute value of the relative velocity ($|V_{rel}|$) and the difference is greater than or equal to zero, and by determining if the velocity trigger ($V_{Trigger}$) value is false when the relative velocity limit up or down ($V_{lim\_up/dn}$) is subtracted from the absolute value of the relative velocity ($|V_{rel}|$) and the difference is less than zero, wherein the velocity trigger ($V_{Trigger}$) is enabled if true and is disabled if false;

determining if a displacement trigger ($x_{Trigger}$) value is true when a displacement distance to the opposite stop ($x_{dist\_to\_opp\_stop}$) is subtracted from a displacement limit up or down ($x_{lim\_up/dn}$) and the difference is greater than or equal to zero, and by determining if the displacement trigger ($x_{Trigger}$) value is false when a displacement distance to the opposite stop ($x_{dist\_to\_opp\_stop}$) is subtracted from a displacement limit up or down ($x_{lim\_up/dn}$) and the difference is less than zero, wherein the displacement trigger ($x_{Trigger}$) is enabled if true and is disabled if false;

determining an ESO2 cyclic trigger by determining a maximum value between the displacement trigger ($x_{Trigger}$) and a previous session ESO2 trigger;

multiplying the ESO2 cyclic trigger by the velocity trigger ($V_{Trigger}$) value to determine a current ESO2 trigger;

multiplying the current ESO2 trigger by the ESO2 end-stop magnitude ($ESO2_{Magnitude}$) to determine the ESO2 control signal ($Ctrl_{ESO2}$).

15. The method of claim 1, wherein the skyhook control subprocess further comprises the steps of:

determining if a product of absolute velocity ($V_{abs\_seat}$) of the seat multiplied by the relative velocity ($V_{rel}$) of the seat is greater than zero;

setting the value for the skyhook control signal ($Ctrl_{skyhook}$) to zero when the product is less than or equal to zero; and multiplying a viscous damping coefficient ($C_{sky}$) by the absolute velocity ($V_{abs\_seat}$) of the seat to determine a value of the skyhook control signal ($Ctrl_{skyhook}$).

16. The method of claim 14, wherein the rising edge filter subprocess further comprises the steps of:

processing the skyhook control signal ($Ctrl_{skyhook}$) through a single pole low pass filter;

determining that if a first response (A) from the single pole low pass filter is less than or equal to a second response (B), then the skyhook control signal ($u_{skyhook}$) is equal to a value of the single pole low pass filter of the skyhook control signal ($Ctrl_{skyhook}$); and determining that if the first response (A) from the single pole low pass filter is greater than the second response (B), then the skyhook control signal ($u_{skyhook}$) is equal to a value of the skyhook control signal ($Ctrl_{skyhook}$) from the skyhook control subprocess.

* * * * *